United States Patent
Gramatica et al.

(10) Patent No.: US 10,528,871 B1
(45) Date of Patent: Jan. 7, 2020

(54) STRUCTURING DATA IN A KNOWLEDGE GRAPH

(71) Applicant: Yewno, Inc., Redwood City, CA (US)

(72) Inventors: Ruggero Gramatica, Atherton, CA (US); Haris Dindo, Menlo Park, CA (US)

(73) Assignee: Yewno, Inc., Redwood City, CA (US)

( * ) Notice: Subject to any disclaimer, the term of this patent is extended or adjusted under 35 U.S.C. 154(b) by 0 days.

(21) Appl. No.: 16/354,910

(22) Filed: Mar. 15, 2019

Related U.S. Application Data

(63) Continuation of application No. 16/139,885, filed on Sep. 24, 2018.

(51) Int. Cl.
   *G06N 5/02* (2006.01)
   *G06F 16/901* (2019.01)
   *G06F 16/903* (2019.01)
   *G06K 9/62* (2006.01)

(52) U.S. Cl.
   CPC ............. *G06N 5/02* (2013.01); *G06F 16/903* (2019.01); *G06F 16/9024* (2019.01); *G06K 9/6215* (2013.01)

(58) Field of Classification Search
   CPC ...................................................... G06N 5/02
   See application file for complete search history.

(56) References Cited

U.S. PATENT DOCUMENTS

2016/0188590 A1* 6/2016 Cole .................. G06F 16/9537
                                                               707/747

OTHER PUBLICATIONS

Sleeman, J., Finin, T., and Joshi, A. "Topic modeling for rdf graphs", 3rd International Workshop on Linked Data for Info. Extraction, 14th International Semantic Web Conference, vol. 1267, 2015, pp. 48-62. (Year: 2015).*

Jelodar, H. et al., "Latent Dirichlet allocation (LDA) and topic modeling: models, applications, a survey", Multimedia Tools and Applications, vol. 78, 2019, published online Nov. 28, 2018, pp. 15169-15211. (Year: 2018).*

* cited by examiner

*Primary Examiner* — Vincent Gonzales

(74) *Attorney, Agent, or Firm* — Schwegman Lundberg & Woessner, P.A.

(57) ABSTRACT

Disclosed are systems, methods, and non-transitory computer-readable media for structuring data in a knowledge graph. A data management system determines known concepts that are related to a data snippet. The data management system determines cosine similarity values indicating an intrinsic similarity between the data snippet and the known concepts, as well as pertinence values indicating a measure of topical similarity between the data snippet and the known concepts. The data management system determines, based on the cosine similarity values and the pertinence values, that the data snippet is related to a first known concept, and in response, assigns a concept identifier for the first known concept to the data snippet. Score indicating a strength of connection between the concepts added to the knowledge graph are determined and used to derive insights between the concepts.

23 Claims, 11 Drawing Sheets

STRUCTURING DATA IN A KNOWLEDGE GRAPH

CROSS-REFERENCE TO RELATED APPLICATIONS

The present application claims the benefit of priority of U.S. application Ser. No. 16/139,885, filed on Sep. 24, 2018, which is incorporated herein by reference in its entirety.

TECHNICAL FIELD

An embodiment of the present subject matter relates generally to structuring data and, more specifically, to structuring data in a knowledge graph.

BACKGROUND

Today's world is characterized by ever expanding and interconnected markets: economic, financial, social and political institutions deeply affect each other at an unprecedented rate. In this scenario market agents are exposed to "information overloading", a phenomenon that may lead to poor investment decisions and/or missed investment opportunities. Cutting edge tools are needed to help them to discover and process relevant information.

Science of complexity brings such a tool. Complex systems are systems characterized by a huge number of elements, whose interactions are highly non-trivial and non-linear. As a result, these systems tend to exhibit peculiar behaviors that oscillate between order and randomness. Distinguishing the hidden order from the randomness is one of the main challenges of the science of complexity: once found the correct level of description, systems that seem stochastic and unpredictable can be partially controlled, monitored and predicted.

Examples of complex systems are everywhere: from biology (ant colonies, human brain) to physics (superconductors, granular materials) and social sciences (opinion dynamics, financial markets). Over the last decades the science of complexity has been one of the most interdisciplinary and promising strands of research.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
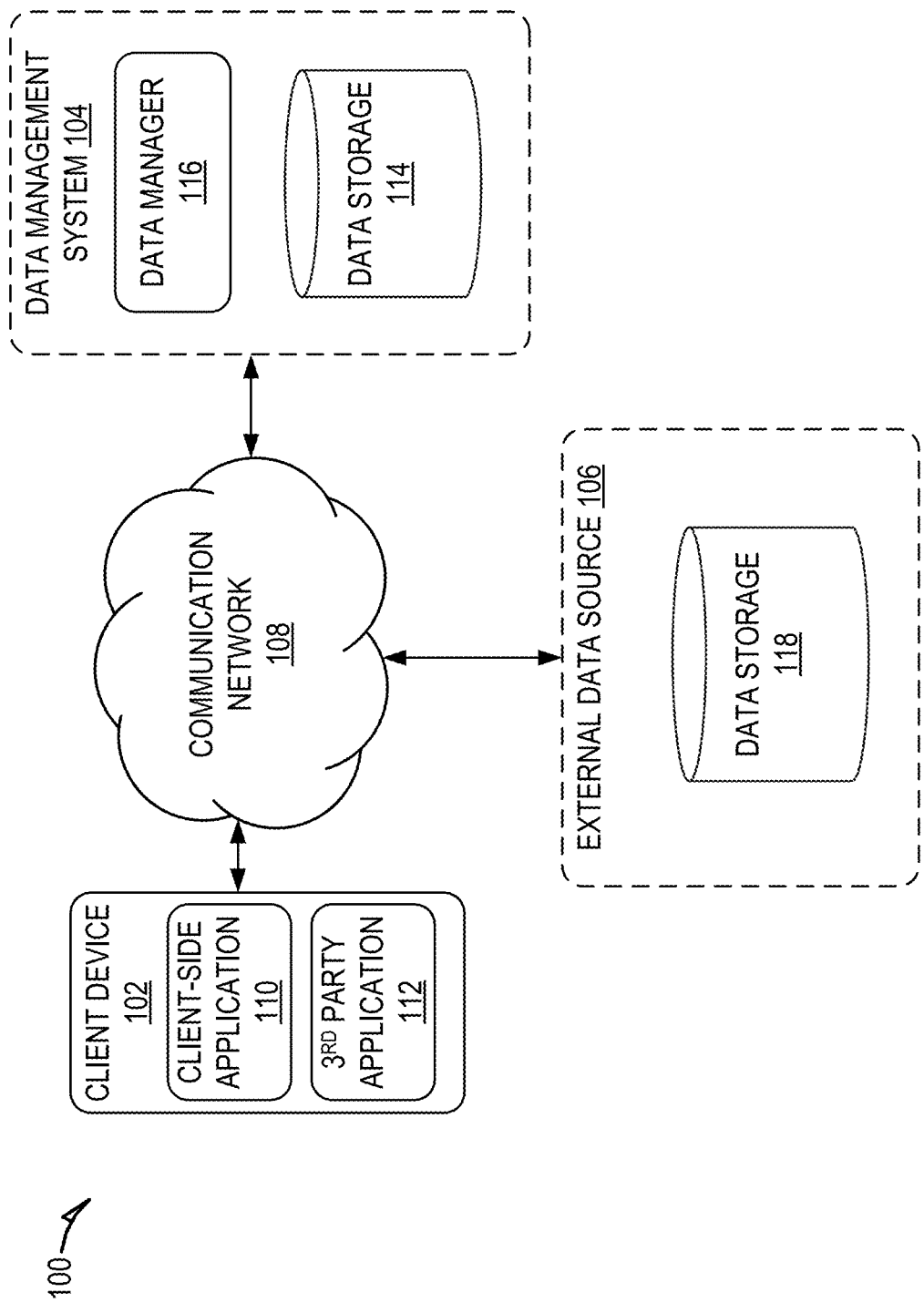
FIG. 1 shows a system, wherein a data management system structures data in a knowledge graph, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for structuring data in a knowledge graph. The knowledge graph represents data as concepts and indicates connections between the concepts. The connections are used to derive insights between the various concepts. For example, a user may use the knowledge graph to identify connections between concepts which were previously unknown to the user.

Each concept in the knowledge graph includes a definition or set of definitions, a semantic projection, and a topic projection. A definition is a statement, collection of words, collection of data, collection of images, etc., that describe the meaning of a concept. A semantic projection is a vector ("semantic vector") representing the concept in a semantic space. A semantic vector is determined based on a set of embeddings determined from the definition or set of definitions of the concept. The topic projection is a vector ("topic vector") representing the concept in a topic space. A topic vector is determined based on a distribution of topics of the concept.

A data management system processes both structured and unstructured data, and adds the data to the knowledge graph. That is, the data management system ingests the data and organizes the data into the knowledge graph that allows connections between the data to be analyzed and determined. The data consists of various electric content items, such as electronic documents, electronic images, electronic audio file, etc. The data management system extracts concepts from the content items and adds the concepts to the knowledge graph.

The data management system analyzes a content item in data snippets, which are a subset of the content item. For example, a data snippet of a text file may be a portion of the text from the text file. As another example, a data snippet of an image file may be a portion of the image. The data management system analyzes the content of each data snippet to identify known concepts that may be related in the data snippet. That is, the data management system analyzes tokens (e.g., keywords, data segments, etc.) that are included in the data snippet and compare them to the definitions of the known concepts in the knowledge graph. For example, the data management system identifies that known concepts that have definitions that include tokens from the data snippets.

Identifying matching tokens is an indicator that a data snippet is related to a concept, however may not be definitive. For example, a token such as "Apple" may be related to the concepts of fruit or computing devices. To further distinguish the concept of a data snippet, the data management system determines cosine similarity values indicating an intrinsic similarity between the data snippet and the concepts identified as being related to the data snippet, as well as pertinence values indicating a measure of topical similarity between the data snippet and the concepts identified as being related to the data snippet.

The data management system determines the correct concept for the data snippet based on the cosine similarity values and the pertinence values. For example, the data management system determines estimated likelihoods that the data snippet is related to the concepts based on the cosine similarity values and the pertinence values, and then selects the concept that has the highest estimated likelihood. The data management system assigns an identifier for the selected concept to the data snippet.

The data management system determines the cosine similarity value between a data snippet and a known concept by generating a semantic vector representing the data snippet and determining an angle between the semantic vector representing the data snippet and the semantic vector representing the concept. The data management system determines the pertinence value between a data snippet and a known concept by generating a topic vector representing the data snippet and determining a distance between the topic vector representing the data snippet and the topic vector representing the concept.

In some instances, a data snippet may not be related to any of the known concepts in the knowledge graph. For instance, the data snippet may be related to a concept that has not yet been added to the knowledge graph. In this type of situation, the data management system generates a new concept for the data snippet and adds the new concept to the knowledge graph. To accomplish this, the data management system identifies tokens from the data snippet and generates a definition or set of definitions for the concept based on the tokens. For example, the data management system may extract the definition from the data snippet itself, and/or extract the definition from external searches by executing a search based on the tokens included in the data snippet.

To generate the semantic vector for the new concept, the data management system identifies a set of known data snippets that are similar to the data snippet, and then generates the semantic vector based on the semantic vectors generated based on the set of similar data snippets. For example, the data management system calculates the mean of the semantic vectors, which is assigned as the semantic vector for the new concept.

Likewise, the data management system generates the topic vector for the new concept based on the topic vectors generated based on the set of known data snippets that are similar to the data snippet. For example, the data management system calculates the mean of the topic vectors, which is assigned as the topic vector for the new concept.

The data management system determines connections between the concepts in the knowledge graph, which can be used to derive insights. For example, the data management system generates links between the concepts that indicate and describe a connection between the concepts. For example, the link describes a strength of the connection between two concepts, as well as the type of connection. The data management system determines a link between any two concepts based on a determined similarity between the two concepts as measured based on several factors. For example, the data management system determines similarity between two concepts based on semantic similarity, inferences, and events.

FIG. 1 shows a system 100, wherein a data management system 104 structures data in a knowledge graph, according to some example embodiments. The knowledge graph represents data as concepts and identifies connections between the concepts. A user can use the determined connections in the knowledge graph to derive insights between the various concepts.

As shown, multiple devices (i.e., client device 102, messaging system 104, and external data source 106) are connected to a communication network 108 and configured to communicate with each other through use of the communication network 108. The communication network 108 is any type of network, including a local area network (LAN), such as an intranet, a wide area network (WAN), such as the internet, or any combination thereof. Further, the communication network 108 may be a public network, a private network, or a combination thereof. The communication network 108 is implemented using any number of communications links associated with one or more service providers, including one or more wired communication links, one or more wireless communication links, or any combination thereof. Additionally, the communication network 108 is configured to support the transmission of data formatted using any number of protocols.

Multiple computing devices can be connected to the communication network 108. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 1100 shown in FIG. 11.

To facilitate communication with other computing devices, a computing device includes a communication interface configured to receive a communication, such as a request, data, and so forth, from another computing device in network communication with the computing device and pass the communication along to an appropriate module running on the computing device. The communication interface also sends a communication to another computing device in network communication with the computing device.

In the system 100, users interact with the data management system 104 to access and utilize the functionality of the knowledge graph maintained by the data management system 104. For example, a user uses a client device 102 that is connected to the communication network 108 by direct and/or indirect communication to communicate with and utilize the functionality of the data management system 104. Although the shown system 100 includes only one client device 102, this is only for ease of explanation and is not meant to be limiting. One skilled in the art would appreciate that the system 100 can include any number of client devices 102. Further, the data management system 104 may concurrently accept connections from and interact with any number of client devices 102. The data management system 104 supports connections from a variety of different types of client devices 102, such as desktop computers; mobile computers; mobile communications devices, e.g., mobile phones, smart phones, tablets; smart televisions; set-top boxes; and/or any other network enabled computing devices. Hence, the client device 102 may be of varying type, capabilities, operating systems, etc.

A user interacts with the data management system 104 via a client-side application 119 installed on the client devices 102 and 104. In some embodiments, the client-side application 110 includes a data management system specific component. For example, the component may be a stand-alone application, one or more application plug-ins, and/or a browser extension. However, the users may also interact with the messaging system 106 via a third-party application 112, such as a web browser, that resides on the client device 102 and is configured to communicate with the data management system 104. In either case, the client-side application 110 or the third-party application 112 presents a user interface (UI) for the user to interact with the data management system 104. For example, the user interacts with the data management system 104 via the client-side application 110 integrated with the file system or via a webpage displayed using a third-party application 112, such as a web browser application.

The data management system 104 consists of one or more computing devices configured to structure data in a knowledge graph. The knowledge graph represents data as concepts and identifies connections between the concepts, which a user can use to derive insights. For example, a user may use the connections to identify connections between concepts that were previously unknown to the user. The user may also use the knowledge graph to determine the strength of connection between concepts.

Each concept in the knowledge graph includes a definition or set of definitions, a semantic projection, and a topic projection. A definition is a statement, collection of words, collection of data, collection of images, etc., that describe the meaning of a concept. A semantic projection is a vector ("semantic vector") representing the concept in a semantic space. A semantic vector is determined based on a set of embeddings determined from the definition or set of definitions of the concept. The topic projection is a vector ("topic vector") representing the concept in a topic space. A topic vector is determined based on a distribution of topics of the concept. Connections between the concepts in the knowledge graph indicate concepts that are related, a strength of the connection, the type of connection, as well as a cause of the connection.

The knowledge graph and associated data are stored in the data storage 114. The data management system 104 includes a data manager 116 configured to generate the knowledge graph and provide the functionality of the data management system 104. To generate the knowledge graph, the data manager 116 processes both structured and unstructured data, and adds the data to the knowledge graph. That is, the data manger 116 ingests the data, determines a concept that the data is related to, associates the data with the appropriate concepts, and determines connections between the various concepts. The data manger 116 further provides functionality that enables a user to analyze the knowledge graph and derive insights based on the connections between the concepts.

The data management system 104 receives the data that is ingested from an external data source 106 that is in network communication with the data management system 104. An external data source 106 may be any type of online resource, such as a website, search engine, data library, etc. The external data source 106 includes a data storage 118 that maintains data. The data manager 116 communicates with the external data source 106 via the communication network 108 to request data stored in the data storage 118. In response, the external data source 106 transmits the requested data to the data management system 104, where it is ingested by the data manager 116. Although only a single external data source 106 is shown, this is for ease of explanation and is not meant to be limiting. The system 100 may include any number of external data sources 106 in network communication with the data management system 104, and the data management system 104 may communicate with and receive data from any one or more of the external data sources 106.

The data received from the external data source 106 consists of various electric content items. An electric content item is any type of electronic file, such as an electronic text file, electronic image file, electronic audio file, electronic video file, etc. The data manager 116 extracts concepts from the content items and adds the concepts to the knowledge graph.

The data manager 116 analyzes a content item in data snippets, which are a subset of the content item. For example, a data snippet of a text file may be a portion of the text from the text file (e.g., a sentence, paragraph, etc.). As another example, a data snippet of an image file may be a portion of the image. The data manager 116 identifies snippets of the content item and analyzes the content of each data snippet to identify known concepts that may be related to the data snippet. A known concept is a concept that has already been added to the knowledge graph. To determine whether a concept is related to a data snippet, the data manager 116 analyzes tokens (e.g., keywords, data segments, etc.) that are included in the data snippet and compares the tokens to the definitions of the known concepts in the knowledge graph. For example, the data manager 116 identifies known concepts that have definitions that include tokens from the data snippet.

The data manager 116 may identify the tokens in a variety of ways. For example, the tokens may include words that co-occur in sentences in the data snippet. As another example, the tokens may include unique or non-common words included in the data snippet.

While identifying matching tokens is an indicator that a data snippet is related to a concept, in may not be definitive. For example, a token such as "Apple" may be related to the concepts of fruit or computing devices. To further distinguish the concept of a data snippet, the data manager 116 determines cosine similarity values indicating an intrinsic similarity between the data snippet and the concepts identified as being related to the data snippet, as well as pertinence values indicating a measure of topical similarity between the data snippet and the concepts identified as being related to the data snippet.

The data manager 116 determines the correct concept for the data snippet based on the cosine similarity values and the pertinence values. For example, the data manager 116 determines estimated likelihoods that the data snippet is related to the concepts based on the cosine similarity values and the pertinence values, and then selects the concept that has the highest estimated likelihood. The data manager 116 assigns an identifier for the selected concept to the data snippet. For example, the data manager 116 stores the data snippet in the data storage 114 and associated the data snipped with the identifier for the selected concept.

The data manager 116 determines the cosine similarity value between a data snippet and a known concept by generating a semantic vector representing the data snippet and determining an angle between the semantic vector representing the data snippet and the semantic vector representing the concept. The data manager 116 determines the pertinence value between a data snippet and a known concept by generating a topic vector representing the data snippet and determining a distance between the topic vector representing the data snippet and the topic vector representing the concept. The data manager 116 stores the semantic vector and topic vector for a data snippet in the data storage 114 and associates the vectors with their corresponding data snippet.

In some instances, a data snippet may not be related to any of the known concepts in the knowledge graph. For instance, the data snippet may be related to a concept that has not yet been added to the knowledge graph. In this type of situation, the data manager 116 generates a new concept for the data snippet and adds the new concept to the knowledge graph. To accomplish this, the data manager 116 identifies tokens from the data snippet and generates a definition or set of definitions for the concept based on the tokens. For example, the data manager 116 may extract the definition from the data snippet itself, and/or extract the definition from external searches by executing a search based on the tokens included in the data snippet.

To generate the semantic vector for the new concept, the data manager 116 identifies a set of known data snippets that are similar to the data snippet, and then generates the semantic vector based on the semantic vectors generated based on the set of similar data snippets. For example, the data manager 116 calculates the mean of the semantic vectors, which is assigned as the semantic vector for the new concept.

Likewise, the data manager 116 generates the topic vector for the new concept based on the topic vectors generated based on the set of known data snippets that are similar to the data snippet. For example, the data manager 116 calculates the mean of the topic vectors, which is assigned as the topic vector for the new concept.

The data manager 116 determines connections between the concepts in the knowledge graph, which can be used to derive insights. For example, the data manager 116 generates links between the concepts that indicate and describe a connection between the concepts. For example, the link describes a strength of the connection between two concepts, as well as the type of connection. The data management system determines a link between any two concepts based on a determined similarity between the two concepts as measured based on several factors. For example, the data management system determines similarity between two concepts based on semantic similarity, inferences, and events.

Figure 2:
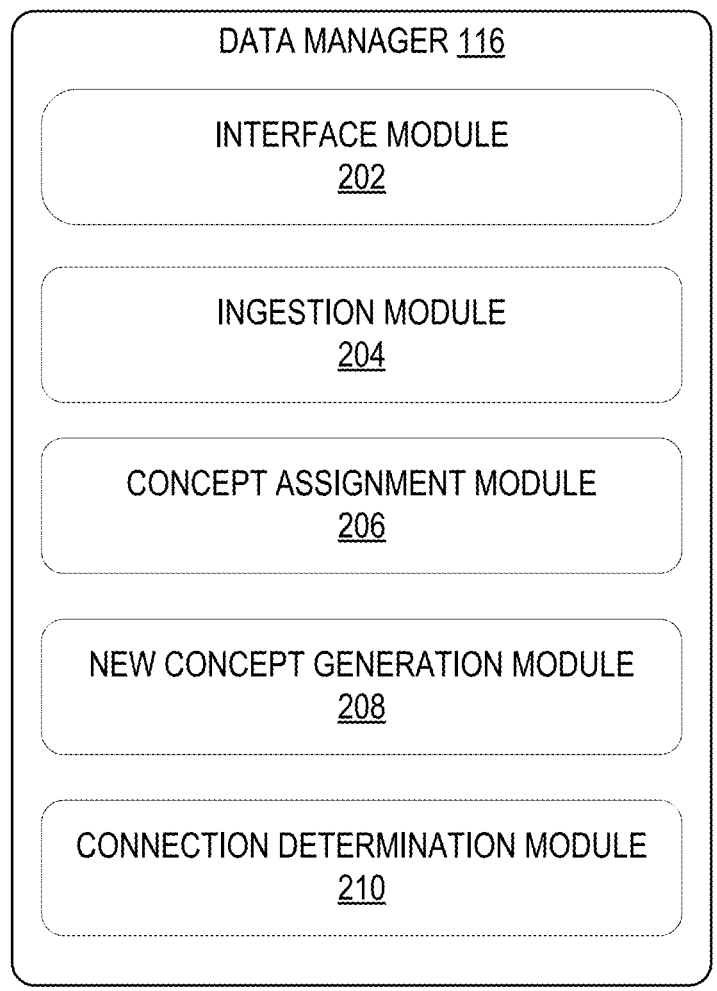
FIG. 2 is a block diagram of the data manager, according to some example embodiments.

FIG. 2 is a block diagram of the data manager 116, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the data manager 116 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the data manager 116 includes an interface module 202, an ingestion module 204, a concept assignment module 206, a new concept generation module 208, and a connection determination module 210.

The interface module 202 provides a data management interface that enables a user to utilize the functionality of the data management system 104. That is, the data management interface enables a user to access the knowledge graph, view connections between concepts, generate reports, etc. The data management interface includes user interface elements (e.g., buttons, text boxes, scroll bars, etc.), that a user may use to utilize the functionality of the data management system 104. The interface module 202 provides data entered by a user to the other appropriate modules of the data management system 104 to provide the functionality requested by the user.

The ingestion module 204 ingests data to be added to the knowledge graph. The ingestion module 204 receives data from an external data source 106. For example, the ingestion module 204 transmits a request to the external data source 106 for the data. As another example, the external data source 106 periodically transmits data to the data management system 104, which is received by the ingestion module 204.

The data consists of various electric content items, such as electronic documents, electronic images, electronic audio file, etc. The ingestion module 204 extracts relevant data from the content items. For example, the ingestion module 204 extracts text, images, etc., from the content items, which are used to determine the concepts included in the content item. Data that is not relevant to determining the concepts included in the content items are not extracted. For example, borders, page numbers, etc., that are generic to content items and do not indicate the concepts included in the content item are not extracted by the ingestion module 204. The ingestion module 204 stores the extracted data in the data storage 114. The extracted data is stored along with metadata associated with the data, such as data identifying the source of the data, the time it was ingested, etc. The functionality of the ingestion module 204 is described in greater detail below with respect to FIG. 3.

The concept assignment module 206 assigns concepts to the data received by the ingestion module 204. That is, the concept assignment module 206 determines the concepts included in a content item and assigns a unique identifier associated with the determined concepts to the content item. The concept assignment module 206 analyzes content items in data snippets, which are subsets of the content item. For example, a data snippet of a text file may be a subset of the text, such as a sentence, paragraph, page, etc. As another example, a data snippet of an image file may be a portion of the image file.

The concept assignment module 206 identifies snippets of the content item and analyzes the content of each data snippet to identify known concepts that may be related to the data snippet. A known concept is a concept that has already been added to the knowledge graph. To determine whether a concept is related to a data snippet, the concept assignment module 206 analyzes tokens (e.g., keywords, data segments, etc.) that are included in the data snippet and compares the tokens to the definitions of the known concepts in the knowledge graph. For example, the concept assignment module 206 identifies known concepts that have definitions that include tokens from the data snippet.

The concept assignment module 206 may identify the tokens in a variety of ways. For example, the tokens may include words that co-occur in sentences in the data snippet. As another example, the tokens may include unique or non-common words included in the data snippet.

While identifying matching tokens is an indicator that a data snippet is related to a concept, in may not be definitive. For example, a token such as "Apple" may be related to the concepts of fruit or computing devices. To further distinguish the concept of a data snippet, the concept assignment module 206 determines cosine similarity values indicating an intrinsic similarity between the data snippet and the concepts identified as being related to the data snippet, as well as pertinence values indicating a measure of topical similarity between the data snippet and the concepts identified as being related to the data snippet.

The concept assignment module 206 determines the correct concept for the data snippet based on the cosine similarity values and the pertinence values. For example, the concept assignment module 206 determines estimated likelihoods that the data snippet is related to the concepts based on the cosine similarity values and the pertinence values, and then selects the concept that has the highest estimated likelihood. The concept assignment module 206 assigns an identifier for the selected concept to the data snippet. For example, the concept assignment module 206 stores the data snippet in the data storage 114 and associated the data snipped with the identifier for the selected concept.

The concept assignment module 206 determines the cosine similarity value between a data snippet and a known concept by generating a semantic vector representing the data snippet and determining an angle between the semantic vector representing the data snippet and the semantic vector representing the concept. The concept assignment module 206 determines the pertinence value between a data snippet and a known concept by generating a topic vector representing the data snippet and determining a distance between the topic vector representing the data snippet and the topic vector representing the concept. The concept assignment module 206 stores the semantic vector and topic vector for a data snippet in the data storage 114 and associates the vectors with their corresponding data snippet. The functionality of the concept assignment module 206 is described in greater detail below with respect to FIG. 4.

The new concept generation module 208 generates new concepts and adds them to the knowledge graph. In some instances, a data snippet may not be related to any of the known concepts in the knowledge graph. For instance, the data snippet may be related to a concept that has not yet been added to the knowledge graph. In this type of situation, the new concept generation module 208 generates a new concept for the data snippet and adds the new concept to the knowledge graph. To accomplish this, the new concept generation module 208 identifies tokens from the data snippet and generates a definition or set of definitions for the concept based on the tokens. For example, the new concept generation module 208 may extract the definition from the data snippet itself, and/or extract the definition from external searches by executing a search based on the tokens included in the data snippet.

To generate the semantic vector for the new concept, the new concept generation module 208 identifies a set of known data snippets that are similar to the data snippet, and then generates the semantic vector based on the semantic vectors generated based on the set of similar data snippets. For example, the new concept generation module 208 calculates the mean of the semantic vectors, which is assigned as the semantic vector for the new concept.

Likewise, the new concept generation module 208 generates the topic vector for the new concept based on the topic vectors generated based on the set of known data snippets that are similar to the data snippet. For example, the new concept generation module 208 calculates the mean of the topic vectors, which is assigned as the topic vector for the new concept.

The new concept generation module 208 communicates with the data storage 114 to add the newly created concept the knowledge graph. For example, the new concept generation module 208 updates the knowledge graph in the data storage 114 to include the new concept and associated definition, topic vector and semantic vector. The functionality of the new concept generation module 208 is described in greater detail below with respect to FIG. 6.

The connection determination module 210 determines connections between the concepts in the knowledge graph, which can be used to derive insights. For example, the connection determination module 210 generates links between the concepts that indicate and describe a connection between the concepts. For example, the link describes a strength of the connection between a concept, as well as the type of connection. The data management system determines a link between any two concepts based on a determined similarity between the two concepts as measured based on several factors. For example, the data management system determines similarity between two concepts based on semantic similarity, inferences, and events. The functionality of the connection determination module 210 is described in greater detail below with respect to FIG. 7.

Figure 3:
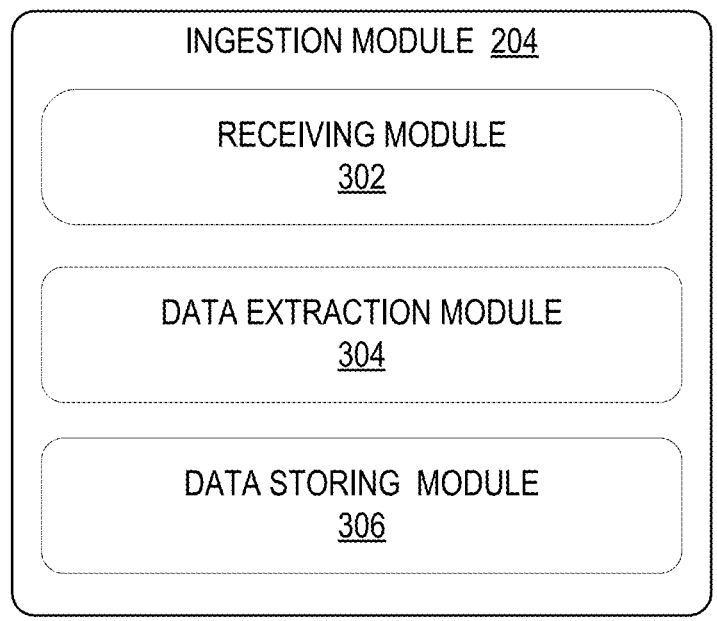
FIG. 3 is a block diagram of the ingestion module, according to some example embodiments.

FIG. 3 is a block diagram of the ingestion module 204, according to some example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the ingestion module 204 to facilitate additional functionality that is not specifically described herein. Furthermore, the various functional modules depicted in FIG. 3 may reside on a single computing device or may be distributed across several computing devices in various arrangements such as those used in cloud-based architectures.

As shown, the ingestion module 204 includes a receiving module 302, a data extraction module 304, and a data storing module 306. The receiving module 302 receives data including content items from external data sources 106. For example, the data is transmitted to the data management system 104 as a result of a request transmitted to the external data source 106 for the data. As another example, the external data source 106 periodically transmits the data to the data management system 104. The received data includes content items of varying types, such as text files, image files, audio files, etc.

The receiving module 302 provides the received content items to the data extraction module 304. The data extraction module 304 extracts relevant data from the content items. For example, the data extraction module 304 extracts text, images, etc., from the content items, which are used to determine the concepts included in the content item. Data that is not relevant to determining the concepts included in the content items are not extracted. For example, borders, page numbers, etc., that are generic to content items and do not indicate the concepts included in the content item are not extracted by the data extraction module 304.

Once the data extraction module 304 has extracted the relevant data from the content items, the data storing module 306 stores the extracted data in the data storage 114. The data extraction module 304 stores the extracted data along with metadata associated with the data, such as data identifying the source of the data, the time the data was ingested, etc. The extracted data is analyzed by the data management system 104 to identify and assign concepts to the extracted data.

Figure 4:
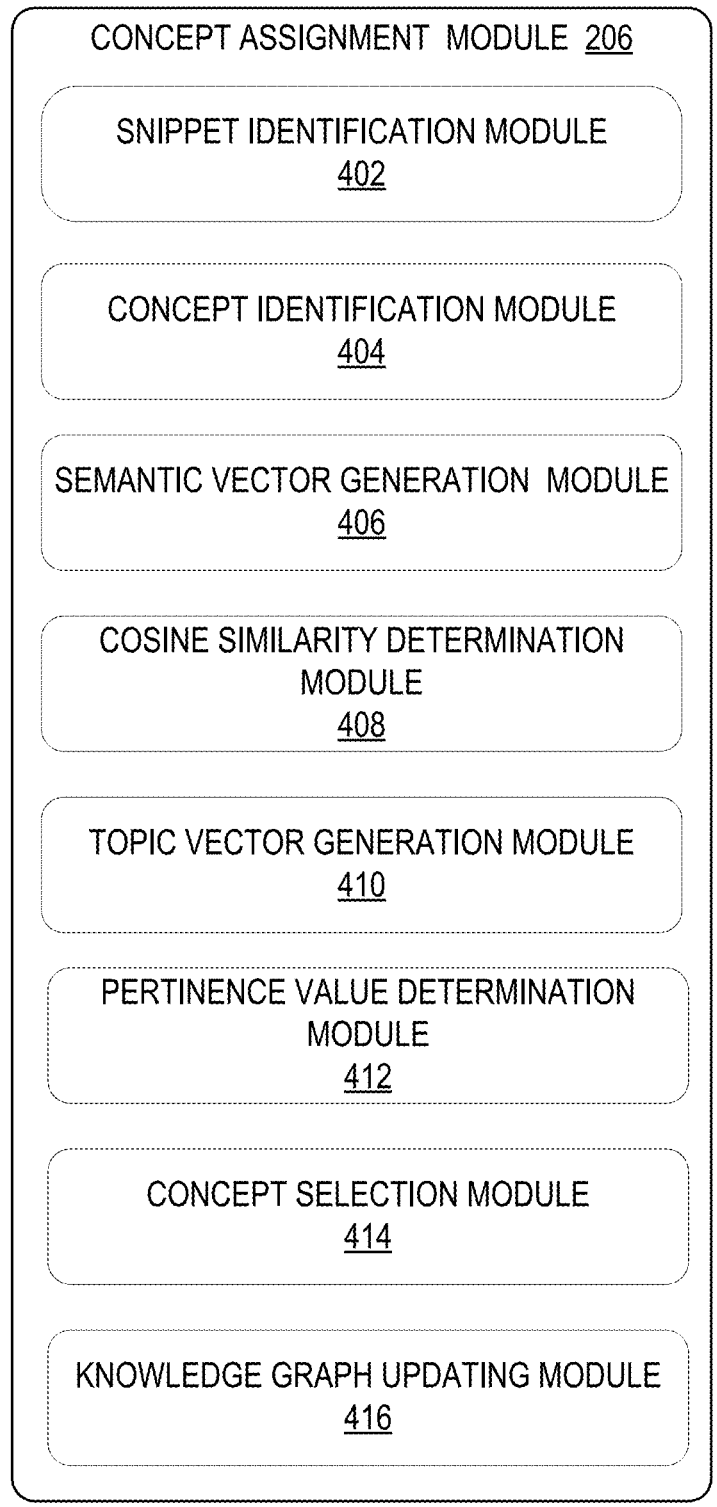
FIG. 4 is a block diagram of the concept assignment module, according to some example embodiments.

FIG. 4 is a block diagram of the concept assignment module 206, according to some example embodiments. To avoid obscuring the inventive subject matter with unnecessary detail, various functional components (e.g., modules) that are not germane to conveying an understanding of the inventive subject matter have been omitted from FIG. 4. However, a skilled artisan will readily recognize that various additional functional components may be supported by the concept assignment module 206 to facilitate additional functionality that is not specifically described herein. Furthermore, the various functional modules depicted in FIG. 4 may reside on a single computing device or may be distributed across several computing devices in various arrangements such as those used in cloud-based architectures.

As shown, the concept assignment module 206 includes a snippet identification module 402, a related concept identification module 404, a semantic vector generation module 406, a cosine similarity determination module 408, a topic vector generation module 410, a pertinence value determination module 412, a concept selection module 414, and a knowledge graph updating module 416.

The snippet identification module 402 identifies data snippets from a content item. A data snippet is a subset of a content item. For example, a data snippet of a text file may be a subset of the text, such as a sentence, paragraph, page, etc. As another example, a data snippet of an image file may be a portion of the image file. The snippet identification module 402 may identify a data snippet using a variety of techniques. For example, a snippet may be identified based on a set number of characters, pixels, bits, etc. In this type of embodiment, the snippet identification module 402 generates snippets from a content item by dividing the content item based on the set number of characters, pixels, etc. Accordingly, a text file can be subdivided into multiple snippets based on a number of characters, such as 50 characters. As another example, an image filed can be subdivided into snippets based on a number of pixels or a squared block of pixels.

In another embodiments, the snippet identification module 402 identifies snippets by identifying borders between data within the content item. A border is a data that indicates a separation between the data on either side of the border. For example, a border may be a special character in text, such as a period, return, end page, etc., that indicates a separation between the data before and after the special character. As another example, a border may be a period of no sound in an audio file, indicating a separation of the audio before and after the period of no sound. As another example, a border may be a distinct change in color in an image file.

The snippet identification module 402 provides the identified snippets to the related concept identification module 404, which identifies known concepts included in the knowledge graph that are related to the data snippet. That is, concept identification module 404 identifies concepts in the knowledge graph that are potential concepts to which the data snippet can be classified. To accomplish this, the concept identification module 404 compares tokens in the data snippet to tokens included in the definitions of the concepts. A token is a determined relevant portion of data from a data snippet and/or definition. For example, a token may be a word or phrase, portion of an image, portion of audio, etc., that is determined to be relevant in a data snippet.

The concept identification module 404 may identify the tokens based on a determined uniqueness of a portion of the content item. Terms, portions of images, etc., that are determined to be unique or uncommon are likely more relevant to the meaning of data than common terms, portions of images, etc. Accordingly, the snippet identification module 402 analyzes the data snippet for unique terms, images, etc., which may be identified as tokens.

As another example, the concept identification module 404 identifies tokens based on co-occurrence of portions of data in the data snippet. For example, co-occurrence of terms in a data snippet may signify that the terms are particularly relevant to the snippet. Accordingly, the concept identification module 404 may identify any such co-occurring terms as tokens for the data snippet.

The concept identification module 404 compares the tokens in the data snippet to tokens included in the definitions of known concepts included in the data graph. For example, the concept identification module 404 identifies definitions that share common tokens as those identified in the data snippet. The concepts associated with the identified definitions are determined to be related to the data snippet.

While identifying matching tokens is an indicator that a data snippet is related to a concept, it may not be definitive. For example, a token such as "Apple" may be related to the concepts of fruit or computing devices. As another example, a token such as "Jaguar" may be related to the concepts of cats or cars. To further distinguish the concept of a data snippet, the concept assignment module 206 determines cosine similarity values indicating an intrinsic similarity between the data snippet and the concepts identified as being related to the data snippet, as well as pertinence values indicating a measure of topical similarity between the data snippet and the concepts identified as being related to the data snippet.

The semantic vector generation module 406 generates a semantic vector representing a both concepts and data snippets, which are used to determine the cosine similarity between a data snippet and a given concept. The semantic vector generation module 406 generates the semantic vector based on embeddings of the data in the data snippet or definition of a concept. An embedding is a portion of the data snippet or concept (e.g., word, set of characters, portion of audio file, etc.) that is mapped to a value that represents the embedding. The semantic vector generation module 406 gathers the values mapped to the embeddings in a data snippet or concept to generate a semantic vector representing the data snippet of concept.

The cosine similarity determination module 408 determines the cosine similarity value between a data snippet and a concept based on the semantic vector for the data snippet as well as a semantic vector generated for the concepts. Specifically, the cosine similarity value is a function of the angle between the two sematic vectors. For example, assuming X is the semantic vector generated to represent data snippet x, and y is the semantic vector generated to represent concept y, the cosine similarity between the data snippet and the concept is defined as:

$$\text{Cos}(x, y) = \frac{x \cdot y}{\|x\| \cdot \|y\|}$$

The cosine similarity determination module 408 determines a cosine similarity value indicating the intrinsic similarity between a data snippet and each of the concepts identified as being related to the data snippet.

The topic vector generation module 410 generates topic vectors representing both data snippets and concepts, which are used to determine the pertinence value between a data snippet and a known concept. A topic vector is generated based on a distribution of topics in the data snippet or definition of a concept. Each data snippet and concept are assigned a set of topics based on an analysis of the data snippet or concept. For example, the topics are assigned using a learning topic modeling methodology, such as Hierarchical Latent Dirichlet Allocation (LDA). The topic model estimates a probability p(t|d) indicating what is the distribution of topics, t, given the data snippet/concept definition d, and a probability p(w|t) indicating what is the distribution of tokens, w, for a given topic t.

Figure 5:
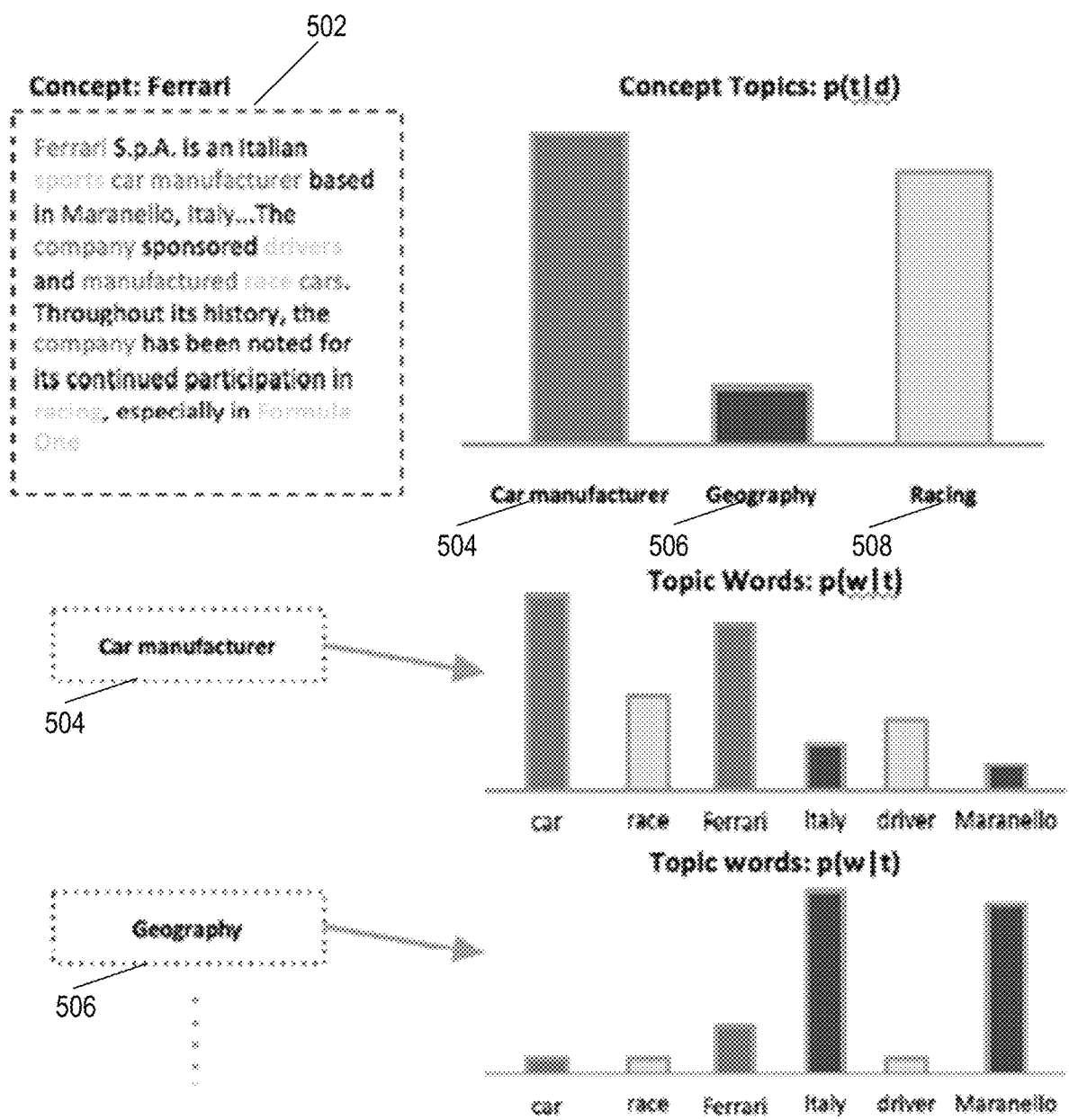
FIG. 5 shows an example of generating a topic vector, according to some example embodiments.

FIG. 5 shows an example of generating a topic vector, according to some example embodiments. As shown, the concept Ferrari includes a definition 502 and is associated with the topics Car Manufacturer 504, Geography 506, and Racing 508. In this example, the probability p(t|d) indicating the distribution of topics for the concept Ferrari indicates a distribution of tokens (e.g., terms) from the definition 502 of the concept Ferrari that are associated with each of the topics assigned to Ferrari (i.e., Car Manufacturer 504, Geography 506, and Racing 508). For example, the distribution indicates that seven of the tokens are related to the topic Car Manufacturer 504, six of the tokens are related to the topic Geography 506, and two of the tokens are related to the topic Racing 508.

As also shown, the probability p(w|t) indicates the distribution of tokens, w, for each of the topics t assigned to the concepts Ferrari. For example, the probability p(w|t) for the topics Car Manufacturer and geography are shown.

Returning to the discussion of FIG. 4, the pertinence value determination module 412 determines the pertinence value between a data snippet and a concept based on the topic vectors generated for each. The pertinence value is determined based on a distance between the topic vectors generated for the data snippet and the concept. For example, assuming X and y are two topic vectors representing the distribution of topics for concepts x and y, respectively, their pertinence value is defined as:

$$\text{Pert}(x \parallel y) = \frac{1}{2}(KLD(x \parallel M) + KLD(y \parallel M))$$

where KLD is the Kullback-Leiber divergence defined as:

$$D_{KL}(x \parallel y) = \sum_j x_{i,j} \log\left(\frac{x_{i,j}}{y_{i,j}}\right)$$

and M is defined as:

$$M = \frac{1}{2}(P + Q)$$

The concept selection module 414 selects the appropriate concept in the data graph for the data snippet based on the cosine similarity values and the pertinence values. For example, the concept selection module 414 determines estimated likelihoods that the data snippet is related to the concepts based on the cosine similarity values and the pertinence values, and then selects the concept that has the highest estimated likelihood. The likelihood value can be calculated in a number of ways. For example, the likelihood value may be an average of the cosine similarity value and the pertinence value.

The knowledge graph updating module 416 assigns an identifier for the selected concept to the data snippet. For example, the knowledge graph updating module 416 stores the data snippet in the data storage 114 and associates the data snipped with the identifier for the selected concept. The knowledge graph updating module 416 also stores the semantic vector and topic vector in the data storage 114 and associates them with the data snippet.

In some instances, the concept assignment module 206 is unable to assign a concept to a data snippet. For example, the concept identification module 404 may be unable to find known concepts in the knowledge graph that may be related to the data snippet. In this type of situation, the new concept generation module 208 generates new concepts based on the data snippet, and the data snippet is assigned to the newly generated concept.

Figure 6:
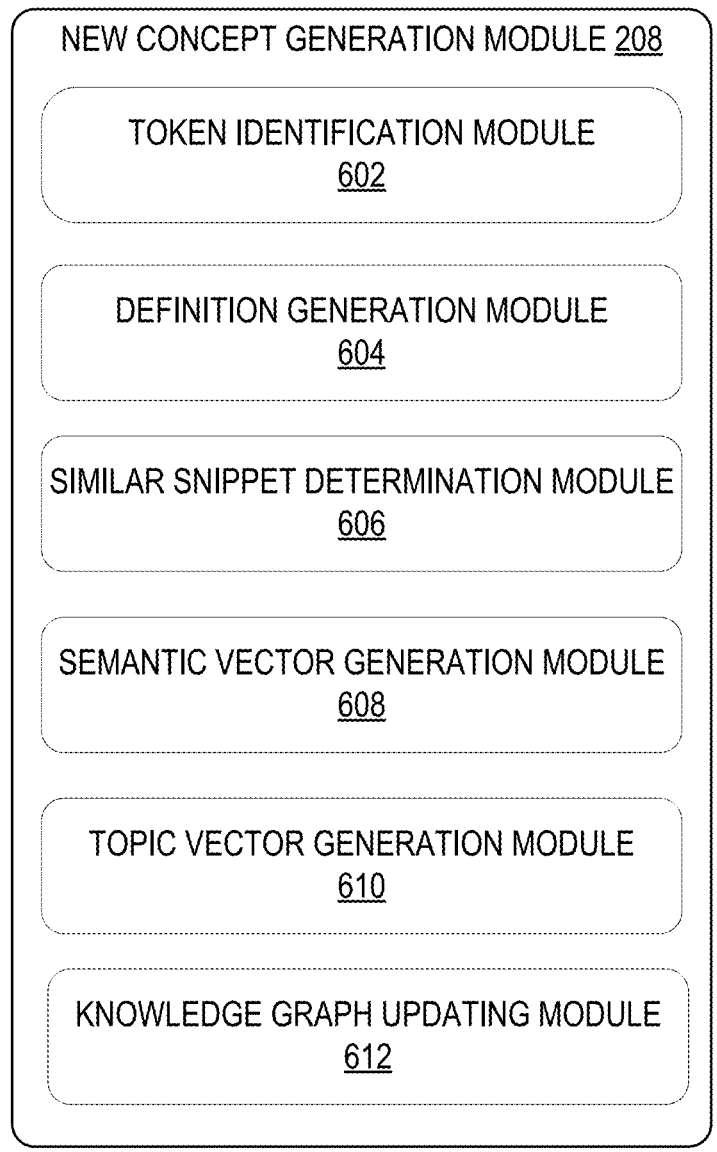
FIG. 6 is a block diagram of the new concept generation module, according to some example embodiments.

FIG. 6 is a block diagram of the new concept generation module 208, according to some example embodiments. To avoid obscuring the inventive subject matter with unnecessary detail, various functional components (e.g., modules) that are not germane to conveying an understanding of the inventive subject matter have been omitted from FIG. 6. However, a skilled artisan will readily recognize that various additional functional components may be supported by the new concept generation module 208 to facilitate additional functionality that is not specifically described herein. Furthermore, the various functional modules depicted in FIG. 6 may reside on a single computing device or may be distributed across several computing devices in various arrangements such as those used in cloud-based architectures.

As shown, the new concept generation module 208 includes a token identification module 602, a definition generation module 604, a similar snippet determination module 606, a semantic vector generation module 608, a topic vector generation module 610, and a knowledge graph updating module 612.

The token identification module 602 identifies tokens from the data snippet. A token is a determined relevant portion of data from a data snippet, For example, a token may be a word or phrase, portion of an image, portion of audio, etc., that is determined to be relevant in a data snippet.

The token identification module 602 may identify the tokens based on a determined uniqueness of a portion of the data snippet. Terms, portions of images, etc., that are determined to be unique or uncommon are likely more relevant to the meaning of the data snippet than common terms, portions of images, etc. Accordingly, the token identification module 602 analyzes the data snippet for unique terms, images, etc., which may be identified as tokens.

As another example, the token identification module 602 identifies tokens based on co-occurrence of portions of data in the data snippet. Co-occurrence of terms in a data snippet may signify that the terms are particularly relevant to the data snippet. Accordingly, the token identification module 602 may identify any such co-occurring terms as tokens for the data snippet.

The definition generation module 604 generates a definition for a new concept based on the tokens identified in the data snippet. For example, the definition generation module 604 extracts the definition from the data snippet based on portions of the data snippet that include the identified tokens. As another example, the definition generation module 604 uses the tokens to execute search queries of external data sources 106 to determine a definition for the data snippet. For example, the definition generation module 604 executes one or more search queries that include a token or combination of tokens from the data snippet. The definition generation module 604 analyzed the returned search results to generate the definition for the new concepts. For example, the definition generation module 604 identifies relevant portions of the search results, which are used to generate the definition.

The similar snippet determination module 606 identifies a set of known data snippets that are similar to a given data snippet. As explained previously, data snippets that have been assigned concept identifiers are stored in the data storage 114 along with the semantic vector and topic vector generated based on the data snippets. To identify data snippets that are similar to a given data snippet, the similar snippet determination module 606 uses a clustering algorithm to cluster the semantic vector generated from the given data snippet with other semantic vectors generated from other data snippets. That is, the clustering algorithm projects the semantic vectors for the given data snippet and the known data snippets into a multi-dimensional space and then identifies a set of the semantic vectors that are nearby the semantic vector for the given data snippet. The similar snippet determination module 606 performs the same functionality with the topic vectors generated for the given data snippet and the known data snippet. The known data snippets that correspond to the semantic and topic vectors that are determined to be near the semantic and topic vector for the given data snippet are determined as the set of similar data snippets.

The semantic vector generation module 608 generates a semantic vector for the new concept based on the set of similar data snippets identified by the similar snippet determination module 606. That is, the semantic vector generation module 608 generates the semantic vector for the concept based on the semantic vectors corresponding to the set of known data snippets. For example, the semantic vector generation module 608 generates a semantic vector that is an average of the semantic vectors corresponding to the set of known data snippets.

Similarly, the topic vector generation module 610 generates a topic vector for the new concepts based on the topic vectors corresponding to the set of known data snippets. For example, the topic vector generation module 610 generates a topic vector that is an average of the topic vectors corresponding to the set of known data snippets.

The knowledge graph updating module 612 updates the knowledge graph to include the newly created concept. For example, the knowledge graph updating module 612 generates a unique identifier for the new concept, and updates the knowledge graph in the data storage 114 to include the new concept. This includes updating the knowledge graph to include the unique identifier, definition or set of definitions, semantic vector, and topic vector for the new concept. The knowledge graph updating module 612 also assigns the unique identifier for the concept to the data snippet used to generate the new concept, which is also stored in the data storage 114.

Figure 7:
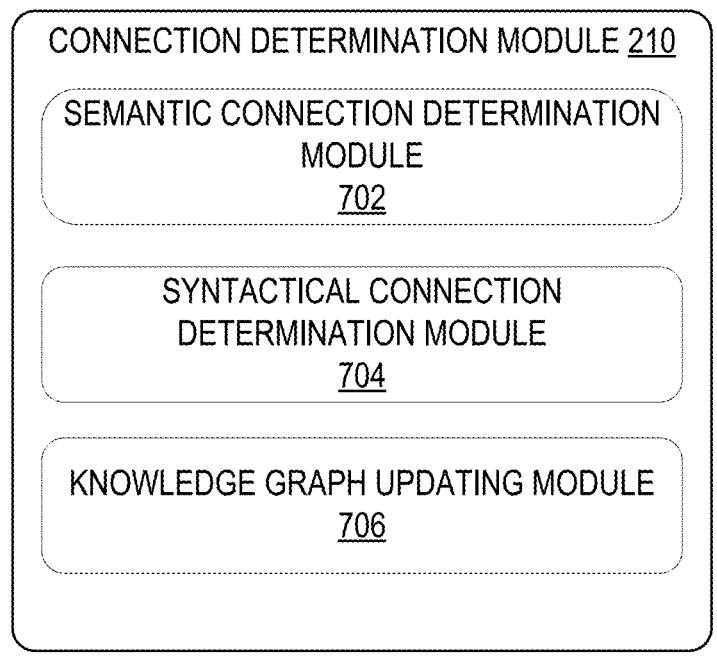
FIG. 7 is a block diagram of the connection determination module, according to some example embodiments.

FIG. 7 is a block diagram of the connection determination module 210, according to some example embodiments. To avoid obscuring the inventive subject matter with unnecessary detail, various functional components (e.g., modules) that are not germane to conveying an understanding of the inventive subject matter have been omitted from FIG. 7. However, a skilled artisan will readily recognize that various additional functional components may be supported by the connection determination module 210 to facilitate additional functionality that is not specifically described herein. Furthermore, the various functional modules depicted in FIG. 7 may reside on a single computing device or may be distributed across several computing devices in various arrangements such as those used in cloud-based architectures.

As shown, the connection determination module 210 includes a semantic connection determination module 702, a syntactical connection determination module 704, and a knowledge graph updating module 706. The semantic connection determination module 702 determines semantic connections between concepts. For example, the semantic connection determination module 704 determines connections between concepts based on the above described cosine similarity values and pertinence values calculated based on the concepts. That is, the semantic connection determination module 702 determines a semantic connection between two concepts based on the angle between the sematic vectors generated for each concept. Also, the semantic connection determination module 702 determines a semantic connection between two concepts based on the measured distance between the topic vectors generated for each concept.

In addition to the cosine similarity values and the pertinence values, the semantic connection determination module 702 also determines semantic connections between concepts based on a log-likelihood ratio (LLR) score determined based on the concepts. The LLR score indicates similarity based on co-occurrence of concepts in similar contexts. That is, the LLR score indicates whether two concepts occur together more often than chance. LLR is a hypothesis testing method that provides a mathematical tool for comparing two alternate hypotheses. Using LLR, the association between concepts x and y is defined as:

$$LLR(x, y) \approx \sum_{X \in \{x, \neg x\}} \sum_{Y \in \{y, \neg y\}} p(x, y) \log \frac{p(X, Y)}{p(X)p(Y)}$$

where ¬x indicates the absence of concepts x in the given context, and marginal and joint probabilities p(x, y), p(¬x, y), p(x, ¬y) and p(¬x, ¬y) are calculated using maximum likelihood approach. The strength of association between concepts implicitly induces a graph-like network whereby similar concepts are directly connected by edges whose weight is proportional to the above-mentioned LLR score.

The syntactical connection determination module 704 determines connections between concepts from a syntactical point of view. That is, the syntactical connection determination module 704 determines connections between concepts based on inferences extracted from content items where the two concepts appear. An inference is a set of subject-verb-object (SVO) propositions that represent a connection between two concepts. The syntactical connection determination module 704 generates an inference automatically from a short span of data in a content item, such as 1-3 sentences in a text file. The generated inference represents a query-based summary created with respect to the two target concepts.

To generate inferences, the syntactical connection determination module 704 extracts clauses from content items. A clause is a statement or a question that generally consists of a subject and a verb phrase and constitutes a complete thought. The goal of clause extraction is to find meaningful parts of content items (e.g., sentences) with respect to target concepts, while leaving out arbitrary information. One example of a clause is a portion of a content item that includes three constituents: subject, verb and object. Another example is a portion of a content item that contains target tokens (e.g. concepts) in both subject and object constituents. The type of relation between two target tokens is defined as being either primary if a Subject-Object relation is detected between concepts, or secondary if no Subject-Object relation is detected between the concepts. The type of relation is an important indicator of the strength of the connection between the two target tokens when determining an inference based on the tokens. The resulting inferential clauses and identified type of relation, are used by the syntactical connection determination module 704 to determine a connection score for the concepts.

The syntactical connection determination module 704 measures the strength of connection by detecting the degree of mutual involvement and connection between the two target tokens. For example, the syntactical connection determination module 704 calculates the connection score based on the length of the path between the two target tokens in a dependency parse tree and take into account the type of connection detected during inference extraction step.

An example, algorithm for calculating the connection score is as follows:

1. Generate a dependency parse for each sentence in a resulting inference.
2. Transform the dependency parse into tree graph.
3. For each inference sentence that contains both target tokens, find the minimum path length in the tree graph (if the path exists).
4. Normalize each minimum path length by the sentence length.
5. Calculate the average path length for all inference sentences that contain both target tokens.
6. Adjust the score calculation to previously detected relation type between target concepts ("primary" or "secondary").

The connection scores are then formulated as follows:

$$\text{score}_p = 1 + 1 \left( 1 - \left( \sum_1^n SentenceShortestPathLen/SentenceLen \right) \Big/ n \right),$$

$$\text{score}_s = 1 - \left( \sum_1^n SentenceShortestPathLen/SentenceLen \right) \Big/ n,$$

where $\text{score}_p$ and $\text{score}_s$ represent the scores for primary and secondary relationship respectively, and n denotes the number of sentences that contain both target tokens in the resulting inference. If the path is not found for the target tokens in any of the inference sentences, the syntactical connection determination module 704 sets the connection score to 1 for primary relation, and 0 for secondary relation.

The knowledge graph updating module 706 updates the knowledge graph to include the determined connections between the concepts. For example, the knowledge graph updating module 706 adds concepts found to have a relationship by the semantic connection determination module 702, a syntactical connection determination module 704 to the knowledge graph. The knowledge graph updating module 706 also sets a score for the connections based on their LLR and connection scores. For example, the score for the connections may be the average of the LLR and connection scores.

Figure 8:
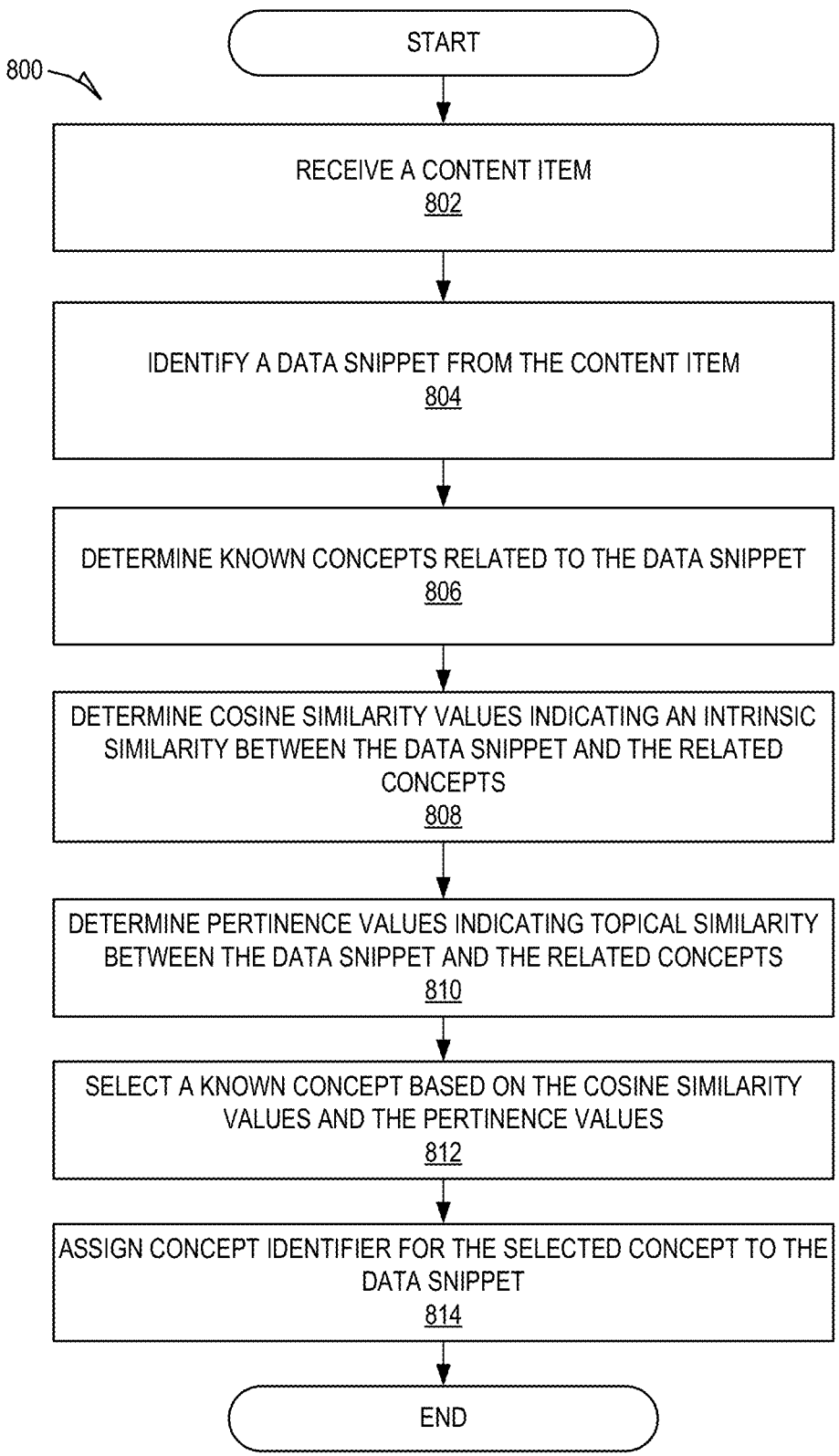
FIG. 8 is a flowchart showing an example method of structuring data in a knowledge graph, according to certain example embodiments.

FIG. 8 is a flowchart showing an example method 800 of structuring data in a knowledge graph, according to certain example embodiments. The method 800 may be embodied in computer readable instructions for execution by one or more processors such that the operations of the method 800 may be performed in part or in whole by the data manager 116; accordingly, the method 800 is described below by way of example with reference thereto. However, it shall be appreciated that at least some of the operations of the method 800 may be deployed on various other hardware configurations and the method 800 is not intended to be limited to the data manager 116.

At operation 802, the receiving module 302 receives a content item. The receiving module 302 receives data including content items from external data sources 106. For example, the data is transmitted to the data management system 104 as a result of a request transmitted to the external data source 106 for the data. As another example, the external data source 106 periodically transmits the data to the data management system 104. The received data includes content items of varying types, such as text files, image files, audio files, etc.

At operation 804, the snippet identification module 402 identifies a data snippet from the content item. A data snippet is a subset of a content item. For example, a data snippet of a text file may be a subset of the text, such as a sentence, paragraph, page, etc. As another example, a data snippet of an image file may be a portion of the image file. The snippet identification module 402 may identify a data snippet using a variety of techniques. For example, a snippet may be identified based on a set number of characters, pixels, bits, etc. In this type of embodiment, the snippet identification module 402 generates snippets from a content item by dividing the content item based on the set number of characters, pixels, etc. Accordingly, a text file can be subdivided into multiple snippets based on a number of characters, such as 50 characters. As another example, an image filed can be subdivided into snippets based on a number of pixels or a squared block of pixels.

In another embodiments, the snippet identification module 402 identifies snippets by identifying borders between data within the content item. A border is a data that indicates a separation between the data on either side of the border. For example, a border may be a special character in text, such as a period, return, end page, etc., that indicates that a separation between the data before and after the special character. As another example, a border may be a period of no sound in an audio file, indicating a separation of the audio before and after the period of no sound. As another example, a border may be a distinct change in color in an image file.

At operation 806, the concept identification module 404 determines known concepts related to the data snippet. That is, the concept identification module 404 identifies concepts in the knowledge graph that are potential concepts to which the data snippet can be classified. To accomplish this, the concept identification module 404 compares tokens in the data snippet to tokens included in the definitions of the concepts. A token is a determined relevant portion of data from a data snippet and/or definition. For example, a token may be a word or phrase, portion of an image, portion of audio, etc., that is determined to be relevant in a data snippet.

The concept identification module 404 may identify the tokens based on a determined uniqueness of a portion of the content item. Terms, portions of images, etc., that are determined to be unique or uncommon are likely more relevant to the meaning of data than common terms, portions of images, etc. Accordingly, the snippet identification module 402 analyzes the data snippet for unique terms, images, etc., which may be identified as tokens.

As another example, the concept identification module 404 identifies tokens based on co-occurrence of portions of data in the data snippet. For example, co-occurrence of terms in a data snippet may signify that the terms are particularly relevant to the snippet. Accordingly, the concept identification module 404 may identify any such co-occurring terms as tokens for the data snippet.

The concept identification module 404 compares the tokens in the data snippet to tokens included in the definitions of known concepts included in the data graph. For example, the concept identification module 404 identifies definitions that share common tokens as those identified in the data snippet. The concepts associated with the identified definitions are determined to be related to the data snippet.

At operation 808, the cosine similarity value determination module 408 determines cosine similarity values indicating an intrinsic similarity between the data snippet and the related concept. The cosine similarity determination module 408 determines the cosine similarity value between a data snippet and a concept based on the semantic vector for the data snippet as well as a semantic vector generated for the concepts. Specifically, the cosine similarity value is a function of the angle between the two sematic vectors.

At operation 810, the pertinence value determination module 412 determines pertinence values indicating topical similarity between the data snippet and the related concepts. The pertinence value determination module 412 determines the pertinence value between a data snippet and a concept based on the topic vectors generated for each. The pertinence value is determined based on a distance between the topic vectors generated for the data snippet and the concept.

At operation 812, the concept selection module 414 selects a known concept based on the cosine similarity values and the pertinence values. For example, the concept selection module 414 determines estimated likelihoods that the data snippet is related to the concepts based on the cosine similarity values and the pertinence values, and then selects the concept that has the highest estimated likelihood. The likelihood value can be calculated in a number of ways. For example, the likelihood value may be an average of the cosine similarity value and the pertinence value.

At operation 814, the knowledge graph updating module 416 assigns the concept identifier for the selected concept to the data snippet. For example, the knowledge graph updating module 416 stores the data snippet in the data storage 114 and associates the data snipped with the identifier for the selected concept. The knowledge graph updating module 416 also stores the semantic vector and topic vector in the data storage 114 and associates them with the data snippet.

Figure 9:
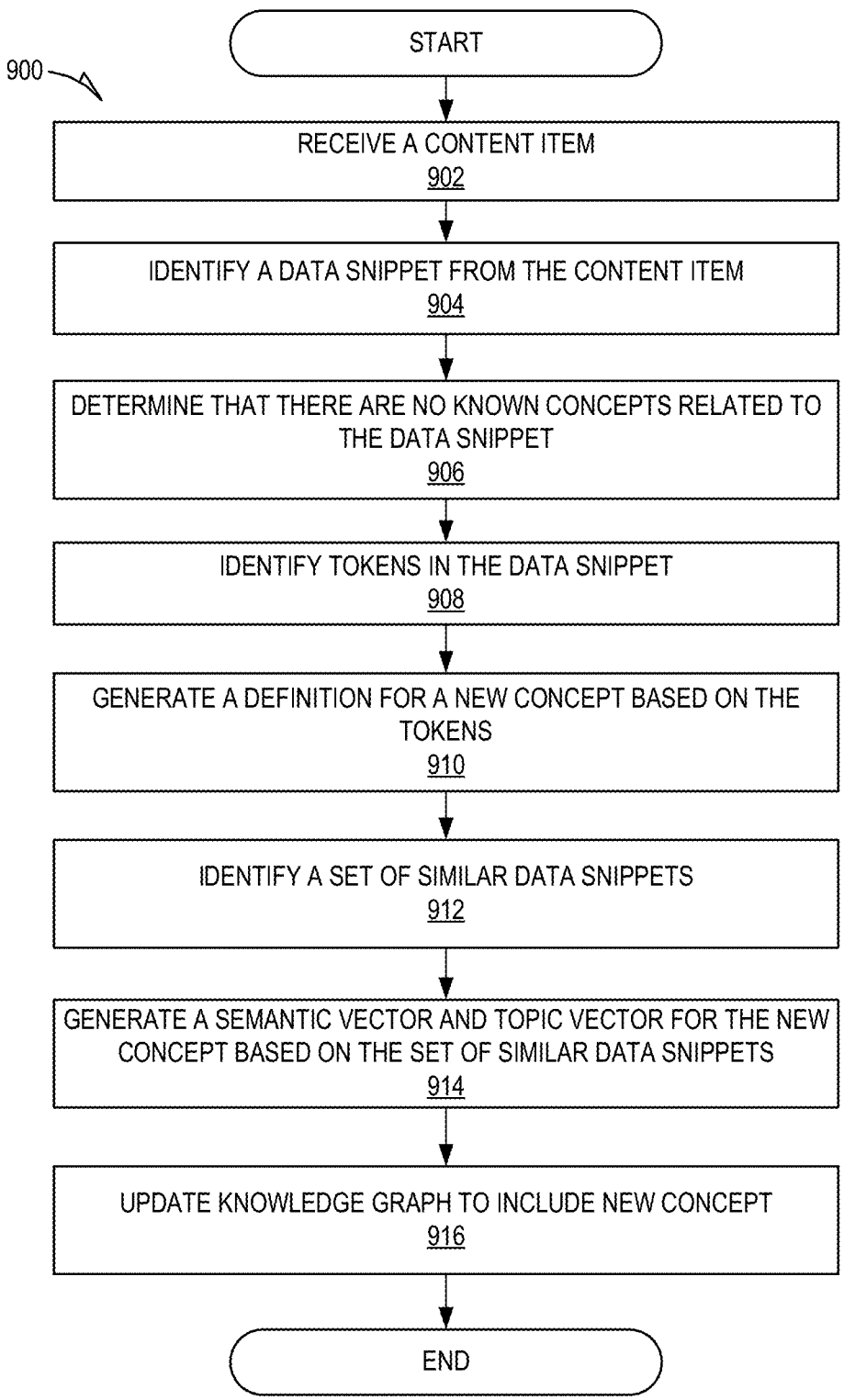
FIG. 9 is a flowchart showing an example method of generating a new concept in a data graph, according to certain example embodiments.

FIG. 9 is a flowchart showing an example method 900 of generating a new concept in a data graph, according to certain example embodiments. The method 900 may be embodied in computer readable instructions for execution by one or more processors such that the operations of the method 900 may be performed in part or in whole by the data manager 116; accordingly, the method 900 is described below by way of example with reference thereto. However, it shall be appreciated that at least some of the operations of the method 900 may be deployed on various other hardware configurations and the method 900 is not intended to be limited to the data manager 116.

At operation 902, the receiving module 302 receives a content item. The receiving module 302 receives data including content items from external data sources 106. For example, the data is transmitted to the data management system 104 as a result of a request transmitted to the external data source 106 for the data. As another example, the external data source 106 periodically transmits the data to the data management system 104. The received data includes content items of varying types, such as text files, image files, audio files, etc.

At operation 904, the snippet identification module 402 identifies a data snippet from the content item. A data snippet is a subset of a content item. For example, a data snippet of a text file may be a subset of the text, such as a sentence, paragraph, page, etc. As another example, a data snippet of an image file may be a portion of the image file. The snippet identification module 402 may identify a data snippet using a variety of techniques. For example, a snippet may be identified based on a set number of characters, pixels, bits, etc. In this type of embodiment, the snippet identification module 402 generates snippets from a content item by dividing the content item based on the set number of characters, pixels, etc. Accordingly, a text file can be subdivided into multiple snippets based on a number of characters, such as 50 characters. As another example, an image filed can be subdivided into snippets based on a number of pixels or a squared block of pixels.

In another embodiments, the snippet identification module 402 identifies snippets by identifying borders between data within the content item. A border is a data that indicates a separation between the data on either side of the border. For example, a border may be a special character in text, such as a period, return, end page, etc., that indicates that a separation between the data before and after the special character. As another example, a border may be a period of no sound in an audio file, indicating a separation of the audio before and after the period of no sound. As another example, a border may be a distinct change in color in an image file.

At operation 906, the concept identification module 404 determines that there are no known concepts related to the data snippet. For example, the concept identification module 404 may be unable to find known concepts in the knowledge graph that may be related to the data snippet.

At operation 908, the token identification module 602 identifies tokens in the data snippet. A token is a determined relevant portion of data from a data snippet. For example, a token may be a word or phrase, portion of an image, portion of audio, etc., that is determined to be relevant in a data snippet.

The token identification module 602 may identify the tokens based on a determined uniqueness of a portion of the data snippet. Terms, portions of images, etc., that are determined to be unique or uncommon are likely more relevant to the meaning of the data snippet than common terms, portions of images, etc. Accordingly, the token identification module 602 analyzes the data snippet for unique terms, images, etc., which may be identified as tokens.

As another example, the token identification module 602 identifies tokens based on co-occurrence of portions of data in the data snippet. Co-occurrence of terms in a data snippet may signify that the terms are particularly relevant to the data snippet. Accordingly, the token identification module 602 may identify any such co-occurring terms as tokens for the data snippet.

At operation 910, the definition generation module 604 generates a definition for a new concept based on the tokens. For example, the definition generation module 604 extracts the definition from the data snippet based on portions of the data snippet that include the identified tokens. As another example, the definition generation module 604 uses the tokens to execute search queries of external data sources 106 to determine a definition for the data snippet. For example, the definition generation module 604 executes one or more search queries that include a token or combination of tokens from the data snippet. The definition generation module 604 analyzed the returned search results to generate the definition for the new concepts. For example, the definition generation module 604 identifies relevant portions of the search results, which are used to generate the definition.

At operation 912, the similar snippet determination module 606 identifies a set of similar data snippets. Data snippets that have been assigned concept identifiers are stored in the data storage 114 along with the semantic vector and topic vector generated based on the data snippets. To identify data snippets that are similar to a given data snippet, the similar snippet determination module 606 uses a clustering algorithm to cluster the semantic vector generated from the given data snippet with other semantic vectors generated from other data snippets. That is, the clustering algorithm projects the semantic vectors for the given data snippet and the known data snippets into a three-dimensional space and then identifies a set of the semantic vectors that are nearby the semantic vector for the given data snippet. The similar snippet determination module 606 performs the same functionality with the topic vectors generated for the given data snippet and the known data snippet. The known data snippets that correspond to the semantic and topic vectors that are determined to be near the semantic and topic vector for the given data snippet are determined as the set of similar data snippets.

At operation 914, the semantic vector generation module 608 and the topic vector generation module 610 generate a semantic vector and a topic vector for the new concept based on the set of similar data snippets. The semantic vector generation module 608 generates the semantic vector for the new concept based on the semantic vectors corresponding to the set of known data snippets. For example, the semantic vector generation module 608 generates a semantic vector that is an average of the semantic vectors corresponding to the set of known data snippets.

Similarly, the topic vector generation module 610 generates a topic vector for the new concept based on the topic vectors corresponding to the set of known data snippets. For example, the topic vector generation module 610 generates a topic vector that is an average of the topic vectors corresponding to the set of known data snippets.

At operation 916, the knowledge graph updating module 612 updates the knowledge graph to include the new concept. For example, the knowledge graph updating module 612 generates a unique identifier for the new concept, and updates the knowledge graph in the data storage 114 to include the new concept. This includes updating the knowledge graph to include the unique identifier, definition or set of definitions, semantic vector, and topic vector for the new concept. The knowledge graph updating module 612 also assigns the unique identifier for the concept to the data snippet used to generate the new concept, which is also stored in the data storage 114.

Software Architecture

Figure 10:
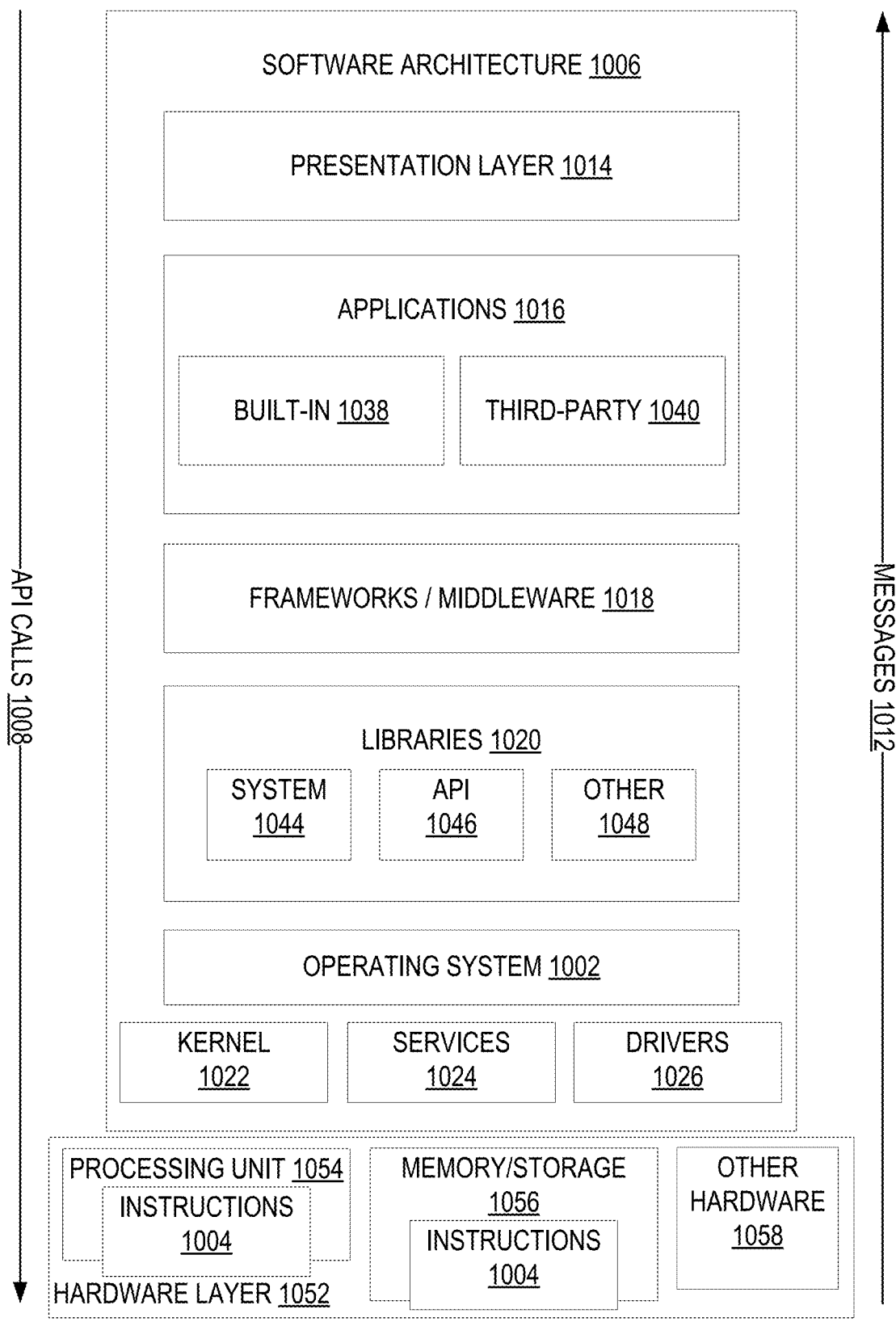
FIG. 10 is a block diagram illustrating an example software architecture, which may be used in conjunction with various hardware architectures herein described.

FIG. 10 is a block diagram illustrating an example software architecture 1006, which may be used in conjunction with various hardware architectures herein described. FIG. 10 is a non-limiting example of a software architecture 1006 and it will be appreciated that many other architectures may be implemented to facilitate the functionality described herein. The software architecture 1006 may execute on hardware such as machine 1100 of FIG. 11 that includes, among other things, processors 1104, memory 1114, and (input/output) I/O components 1118. A representative hardware layer 1052 is illustrated and can represent, for example, the machine 1100 of FIG. 11. The representative hardware layer 1052 includes a processing unit 1054 having associated executable instructions 1004. Executable instructions 1004 represent the executable instructions of the software architecture 1006, including implementation of the methods, components, and so forth described herein. The hardware layer 1052 also includes memory and/or storage modules 1056, which also have executable instructions 1004. The hardware layer 1052 may also comprise other hardware 1058.

In the example architecture of FIG. 10, the software architecture 1006 may be conceptualized as a stack of layers where each layer provides particular functionality. For example, the software architecture 1006 may include layers such as an operating system 1002, libraries 1020, frameworks/middleware 1018, applications 1016, and a presentation layer 1014. Operationally, the applications 1016 and/or other components within the layers may invoke API calls 1008 through the software stack and receive a response such as messages 1012 in response to the API calls 1008. The layers illustrated are representative in nature and not all software architectures have all layers. For example, some mobile or special purpose operating systems may not provide a frameworks/middleware 1018, while others may provide such a layer. Other software architectures may include additional or different layers.

The operating system 1002 may manage hardware resources and provide common services. The operating system 1002 may include, for example, a kernel 1022, services 1024, and drivers 1026. The kernel 1022 may act as an abstraction layer between the hardware and the other software layers. For example, the kernel 1022 may be responsible for memory management, processor management (e.g., scheduling), component management, networking, security settings, and so on. The services 1024 may provide other common services for the other software layers. The drivers 1026 are responsible for controlling or interfacing with the underlying hardware. For instance, the drivers 1026 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 1020 provide a common infrastructure that is used by the applications 1016 and/or other components and/or layers. The libraries 1020 provide functionality that allows other software components to perform tasks in an easier fashion than to interface directly with the underlying operating system 1002 functionality (e.g., kernel 1022, services 1024 and/or drivers 1026). The libraries 1020 may include system libraries 1044 (e.g., C standard library) that may provide functions such as memory allocation functions, string manipulation functions, mathematical functions, and the like. In addition, the libraries 1020 may include API libraries 1046 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1020 may also include a wide variety of other libraries 1048 to provide many other APIs to the applications 1016 and other software components/modules.

The frameworks/middleware 1018 (also sometimes referred to as middleware) provide a higher-level common infrastructure that may be used by the applications 1016 and/or other software components/modules. For example, the frameworks/middleware 1018 may provide various graphic user interface (GUI) functions, high-level resource management, high-level location services, and so forth. The frameworks/middleware 1018 may provide a broad spectrum of other APIs that may be used by the applications 1016 and/or other software components/modules, some of which may be specific to a particular operating system 1002 or platform.

The applications 1016 include built-in applications 1038 and/or third-party applications 1040. Examples of representative built-in applications 1038 may include, but are not limited to, a contacts application, a browser application, a book reader application, a location application, a media application, a messaging application, and/or a game application. Third-party applications 1040 may include an application developed using the ANDROID™ or IOS™ software development kit (SDK) by an entity other than the vendor of the particular platform, and may be mobile software running on a mobile operating system such as IOS™ ANDROID™, WINDOWS® Phone, or other mobile operating systems. The third-party applications 1040 may invoke the API calls 1008 provided by the mobile operating system (such as operating system 1002) to facilitate functionality described herein.

The applications 1016 may use built in operating system functions (e.g., kernel 1022, services 1024 and/or drivers 1026), libraries 1020, and frameworks/middleware 1018 to create user interfaces to interact with users of the system. Alternatively, or additionally, in some systems, interactions with a user may occur through a presentation layer, such as presentation layer 1014. In these systems, the application/component "logic" can be separated from the aspects of the application/component that interact with a user.

Figure 11:
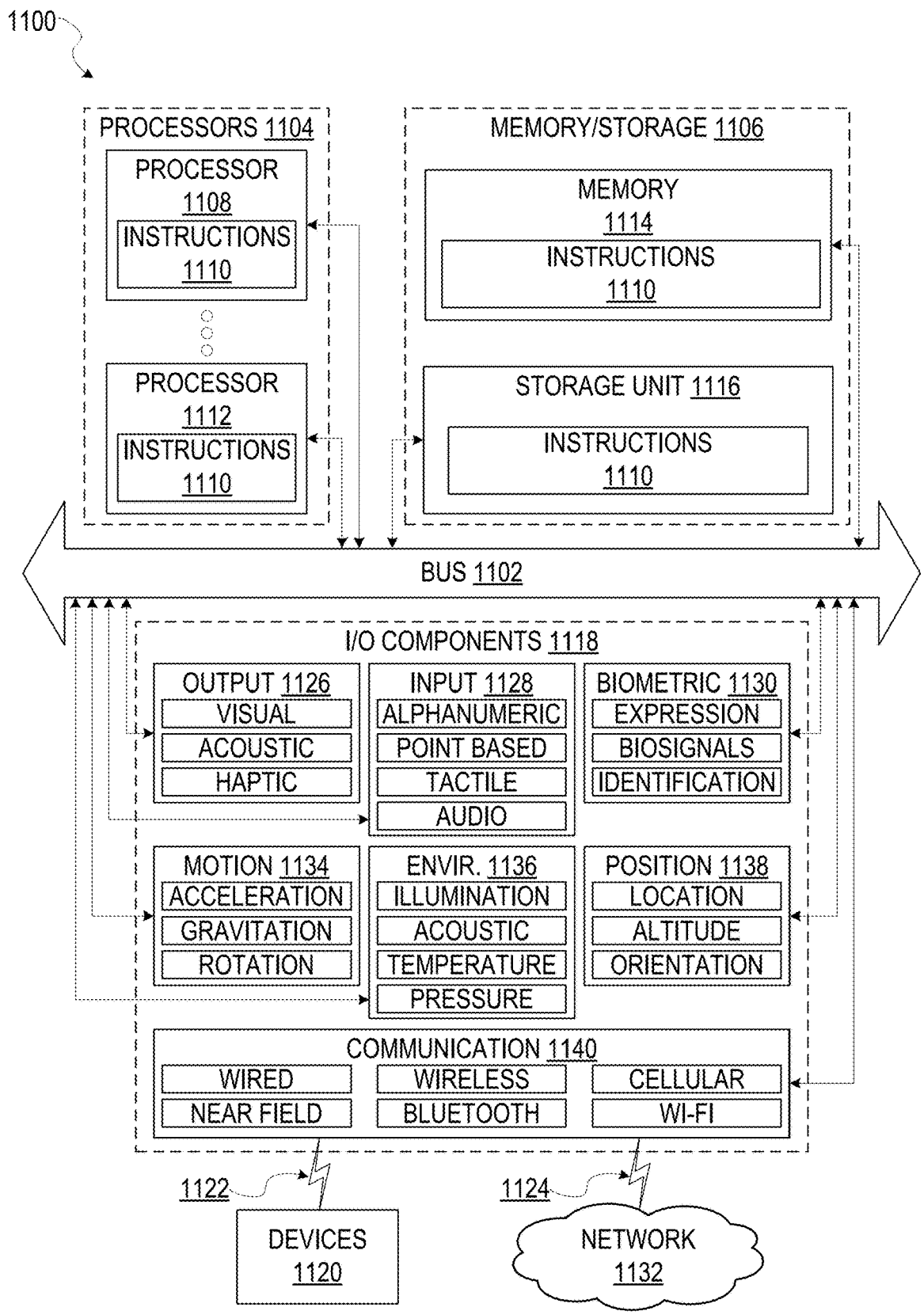
FIG. 11 is a block diagram illustrating components of a machine, according to some example embodiments, able to read instructions from a machine-readable medium (e.g., a machine-readable storage medium) and perform any one or more of the methodologies discussed herein.

FIG. 11 is a block diagram illustrating components of a machine 1100, according to some example embodiments, able to read instructions 1004 from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1110 (e.g., software, an application, an applet, an app, or other executable code) for causing the machine 1100 to perform any one or more of the methodologies discussed herein may be executed. As such, the instructions 1110 may be used to implement modules or components described herein. The instructions 1110 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1100 capable of executing the instructions 1110, sequentially or otherwise, that specify actions to be taken by machine 1100. Further, while only a single machine 1100 is illustrated, the term "machine" shall also be taken to include a collection of machines that individually or jointly execute the instructions 1110 to perform any one or more of the methodologies discussed herein.

The machine 1100 may include processors 1104, memory/storage 1106, and I/O components 1118, which may be configured to communicate with each other such as via a bus 1102. The memory/storage 1106 may include a memory 1114, such as a main memory, or other memory storage, and a storage unit 1116, both accessible to the processors 1104 such as via the bus 1102. The storage unit 1116 and memory 1114 store the instructions 1110 embodying any one or more of the methodologies or functions described herein. The instructions 1110 may also reside, completely or partially, within the memory 1114, within the storage unit 1116, within at least one of the processors 1104 (e.g., within the processor's cache memory), or any suitable combination thereof, during execution thereof by the machine 1100. Accordingly, the memory 1114, the storage unit 1116, and the memory of processors 1104 are examples of machine-readable media.

The I/O components 1118 may include a wide variety of components to receive input, provide output, produce output, transmit information, exchange information, capture measurements, and so on. The specific I/O components 1118 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1118 may include many other components that are not shown in FIG. 11. The I/O components 1118 are grouped according to functionality merely for simplifying the following discussion and the grouping is in no way limiting. In various example embodiments, the I/O components 1118 may include output components 1126 and input components 1128. The output components 1126 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1128 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1118 may include biometric components 1130, motion components 1134, environmental components 1136, or position components 1138 among a wide array of other components. For example, the biometric components 1130 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1134 may include acceleration sensor components (e.g., accelerometer), gravitation sensor components, rotation sensor components (e.g., gyroscope), and so forth. The environmental components 1136 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1138 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1118 may include communication components 1140 operable to couple the machine 1100 to a network 1132 or devices 1120 via coupling 1124 and coupling 1122, respectively. For example, the communication components 1140 may include a network interface component or other suitable device to interface with the network 1132. In further examples, communication components 1140 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1120 may be another machine or any of a wide variety of peripheral devices (e.g., a peripheral device coupled via a USB).

Moreover, the communication components 1140 may detect identifiers or include components operable to detect identifiers. For example, the communication components 1140 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1140, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 1110 for execution by the machine 1100, and includes digital or analog communications signals or other intangible medium to facilitate communication of such instructions 1110. Instructions 1110 may be transmitted or received over the network 1132 using a transmission medium via a network interface device and using any one of a number of well-known transfer protocols.

"CLIENT DEVICE" in this context refers to any machine 1100 that interfaces to a communications network 1132 to obtain resources from one or more server systems or other client devices. A client device 102 may be, but is not limited to, a mobile phone, desktop computer, laptop, PDAs, smart phones, tablets, ultra books, netbooks, laptops, multi-processor systems, microprocessor-based or programmable consumer electronics, game consoles, STBs, or any other communication device that a user may use to access a network 1132.

"COMMUNICATIONS NETWORK" in this context refers to one or more portions of a network 1132 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1132 or a portion of a network 1132 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device, or other tangible media able to store instructions 1110 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 1110. The term "machine-readable medium" shall also be taken to include any medium, or combination of multiple media, that is capable of storing instructions 1110 (e.g., code) for execution by a machine 1100, such that the instructions 1110, when executed by one or more processors 1104 of the machine 1100, cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1104) may be configured by software (e.g., an application 1016 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 1104 or other programmable processor 1104. Once configured by such software, hardware components become specific machines 1100 (or specific components of a machine 1100) uniquely tailored to perform the configured functions and are no longer general-purpose processors 1104. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1104 configured by software to become a special-purpose processor, the general-purpose processor 1104 may be configured as respectively different special-purpose processors (e.g., comprising different hardware components) at different times. Software accordingly configures a particular processor or processors 1104, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 1102) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 1104 that are temporarily configured (e.g., by software) or permanently configured to perform the relevant operations. Whether temporarily or permanently configured, such processors 1104 may constitute processor-implemented components that operate to perform one or more operations or functions described herein. As used herein, "processor-implemented component" refers to a hardware component implemented using one or more processors 1104. Similarly, the methods described herein may be at least partially processor-implemented, with a particular processor or processors 1104 being an example of hardware. For example, at least some of the operations of a method may be performed by one or more processors 1104 or processor-implemented components. Moreover, the one or more processors 1104 may also operate to support performance of the relevant operations in a "cloud computing" environment or as a "software as a service" (SaaS). For example, at least some of the operations may be performed by a group of computers (as examples of machines 1100 including processors 1104), with these operations being accessible via a network 1132 (e.g., the Internet) and via one or more appropriate interfaces (e.g., an API). The performance of certain of the operations may be distributed among the processors 1104, not only residing within a single machine 1100, but deployed across a number of machines 1100. In some example embodiments, the processors 1104 or processor-implemented components may be located in a single geographic location (e.g., within a home environment, an office environment, or a server farm). In other example embodiments, the processors 1104 or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine 1100. A processor 1104 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor may further be a multi-core processor having two or more independent processors 1104 (sometimes referred to as "cores") that may execute instructions 1110 contemporaneously.

What is claimed is:

1. A method comprising:
    identifying, from a content item, a data snippet that is a subset of the content item;
    determining, based on the data snippet and definitions of a set of known concepts included in a data graph, a first known concept and a second known concept to which the data snippet is related;
    determining a first cosine similarity value indicating an intrinsic similarity between the data snippet and the first known concept, and a second cosine similarity value indicating an intrinsic similarity between the data snippet and the second known concept;
    determining a first pertinence value indicating a measure of topical similarity between the data snippet and the first known concept, and a second pertinence value indicating a measure of topical similarity between the data snippet and the second known concept;
    determining, based on the first cosine similarity value, the second cosine similarity value, the first pertinence value, and the second pertinence value, that the data snippet is related to the first known concept; and
    assigning a concept identifier for the first known concept to the data snippet.

2. The method of claim 1, wherein determining the first cosine similarity value and the second cosine similarity value comprises:
    generating a first semantic vector representing the data snippet, the first semantic vector generated based on values mapped to a set of embeddings included in the data snippet;
    determining a first angle measured between the first semantic vector and a second semantic vector representing the first known concept, the second semantic vector generated based on values mapped to a set of embeddings included in a definition of the first known concept, wherein the first cosine similarity value is based on the first angle; and
    determining a second angle measured between the first semantic vector and a third semantic vector representing the second known concept, the third semantic vector generated based on values mapped to a set of embeddings included in a definition of the second known concept, wherein the second cosine similarity value is based on the second angle.

3. The method of claim 1, wherein determining the first pertinence value and the second pertinence value comprises:
    assigning, based on tokens included in the data snippet, topics for the data snippet;
    generating, based on the topics for the data snippet, a topic vector for the data snippet, the topic vector for the data snippet representing a distribution of the topics for the data snippet in the data snippet;
    determining a similarity between the topic vector for the data snippet and a topic vector for the first known concept, the topic vector for the first known concept representing a distribution of topics of the first known concept, wherein the first pertinence value is based on the similarity between the topic vector for the data snippet and the topic vector for the first known concept; and
    determining a similarity between the topic vector for the data snippet and a topic vector for the second known concept, the topic vector for the second known concept representing a distribution of topics of the second known concept, wherein the second pertinence value is based on the similarity between the topic vector for the data snippet and the topic vector for the second known concept.

4. The method of claim 1, wherein the content item is a document including text, and the data snippet is a subset of the text included in the document.

5. The method of claim 1, further comprising:
    identifying, from the content item, a second data snippet that is different than the data snippet;
    analyzing the definitions of the set of known concepts included in the data graph based on tokens included in the second data snippet to identify known concepts that are related to the second data snippet;
    in response to being unable to identify at least one known concept from the set of know concepts included in that data graph that is related to the second data snippet, generating a new concept based on the second data snippet; and
    adding the new concept to the knowledge graph.

6. The method of claim 5, wherein generating the new concept based on the second data snippet comprises:
    generating a definition for the new concept based on the tokens included in the second data snippet;
    generating a semantic vector representing the new concept, the semantic vector representing the new concept generated based on a set of semantic vectors generated based on other data snippets that are determined to be similar to a semantic vector generated based on the second data snippet; and
    generating a topic vector representing the new concept, the topic vector representing the new concept generated based on a set of topic vectors generated based on other data snippets that are determined to be similar to a topic vector generated based on the second data snippet.

7. The method of claim 6, wherein generating the definition for the new concept comprises:
    executing a search query based on the tokens included in the second data snippet; and
    generating the definition for the new concept based on at least one search result of the search query.

8. The method of claim 1, further comprising:
    determining a connection between at least two concepts identified in the content item;
    generating a score indicating a strength of connection between the at least two concepts, the score determined based on combining log-likelihood ratio (LLR) scores, cosine similarity scores, and pertinence values determined for the at least two concepts; and
    adding the at least two concepts and the score indicating the strength of connection between the at least two concepts to the knowledge graph.

9. A system comprising:
one or more computer processors; and
one or more computer-readable mediums storing instructions that, when executed by the one or more computer processors, cause the system to perform operations comprising:
 identifying, from a content item, a data snippet that is a subset of the content item;
 determining, based on the data snippet and definitions of a set of known concepts included in a data graph, a first known concept and a second known concept to which the data snippet is related;
 determining a first cosine similarity value indicating an intrinsic similarity between the data snippet and the first known concept, and a second cosine similarity value indicating an intrinsic similarity between the data snippet and the second known concept;
 determining a first pertinence value indicating a measure of topical similarity between the data snippet and the first known concept, and a second pertinence value indicating a measure of topical similarity between the data snippet and the second known concept;
 determining, based on the first cosine similarity value, the second cosine similarity value, the first pertinence value, and the second pertinence value, that the data snippet is related to the first known concept; and
 assigning a concept identifier for the first known concept to the data snippet.

10. The system of claim 9, wherein determining the first cosine similarity value and the second cosine similarity value comprises:
 generating a first semantic vector representing the data snippet, the first semantic vector generated based on values mapped to a set of embeddings included in the data snippet;
 determining a first angle measured between the first semantic vector and a second semantic vector representing the first known concept, the second semantic vector generated based on values mapped to a set of embeddings included in a definition of the first known concept, wherein the first cosine similarity value is based on the first angle; and
 determining a second angle measured between the first semantic vector and a third semantic vector representing the second known concept, the third semantic vector generated based on values mapped to a set of embeddings included in a definition of the second known concept, wherein the second cosine similarity value is based on the second angle.

11. The system of claim 9, wherein determining the first pertinence value and the second pertinence value comprises:
 assigning, based on tokens included in the data snippet, topics for the data snippet;
 generating, based on the topics for the data snippet, a topic vector for the data snippet, the topic vector for the data snippet representing a distribution of the topics for the data snippet in the data snippet;
 determining a similarity between the topic vector for the data snippet and a topic vector for the first known concept, the topic vector for the first known concept representing a distribution of topics of the first known concept, wherein the first pertinence value is based on the similarity between the topic vector for the data snippet and the topic vector for the first known concept; and
 determining a similarity between the topic vector for the data snippet and a topic vector for the second known concept, the topic vector for the second known concept representing a distribution of topics of the second known concept, wherein the second pertinence value is based on the similarity between the topic vector for the data snippet and the topic vector for the second known concept.

12. The system of claim 9, wherein the content item is a document including text, and the data snippet is a subset of the text included in the document.

13. The system of claim 9, the operations further comprising:
 identifying, from the content item, a second data snippet that is different than the data snippet;
 analyzing the definitions of the set of known concepts included in the data graph based on tokens included in the second data snippet to identify known concepts that are related to the second data snippet;
 in response to being unable to identify at least one known concept from the set of know concepts included in that data graph that is related to the second data snippet, generating a new concept based on the second data snippet; and
 adding the new concept to the knowledge graph.

14. The system of claim 13, wherein generating the new concept based on the second data snippet comprises:
 generating a definition for the new concept based on the tokens included in the second data snippet;
 generating a semantic vector representing the new concept, the semantic vector representing the new concept generated based on a set of semantic vectors generated based on other data snippets that are determined to be similar to a semantic vector generated based on the second data snippet; and
 generating a topic vector representing the new concept, the topic vector representing the new concept generated based on a set of topic vectors generated based on other data snippets that are determined to be similar to a topic vector generated based on the second data snippet.

15. The system of claim 14, wherein generating the definition for the new concept comprises:
 executing a search query based on the tokens included in the second data snippet; and
 generating the definition for the new concept based on at least one search result of the search query.

16. The system of claim 9, the operations further comprising:
 determining a connection between at least two concepts identified in the content item;
 generating a score indicating a strength of connection between the at least two concepts, the score determined based on combining log-likelihood ratio (LLR) scores, cosine similarity scores, and pertinence values determined for the at least two concepts; and
 adding the at least two concepts and the score indicating the strength of connection between the at least two concepts to the knowledge graph.

17. A non-transitory computer-readable medium storing instructions that, when executed by one or more computer processors of a computing device, cause the computing device to perform operations comprising:
 identifying, from a content item, a data snippet that is a subset of the content item;

determining, based on the data snippet and definitions of a set of known concepts included in a data graph, a first known concept and a second known concept to which the data snippet is related;

determining a first cosine similarity value indicating an intrinsic similarity between the data snippet and the first known concept, and a second cosine similarity value indicating an intrinsic similarity between the data snippet and the second known concept;

determining a first pertinence value indicating a measure of topical similarity between the data snippet and the first known concept, and a second pertinence value indicating a measure of topical similarity between the data snippet and the second known concept;

determining, based on the first cosine similarity value, the second cosine similarity value, the first pertinence value, and the second pertinence value, that the data snippet is related to the first known concept; and assigning a concept identifier for the first known concept to the data snippet.

18. The non-transitory computer-readable medium of claim 17, wherein determining the first cosine similarity value and the second cosine similarity value comprises:

generating a first semantic vector representing the data snippet, the first semantic vector generated based on values mapped to a set of embeddings included in the data snippet;

determining a first angle measured between the first semantic vector and a second semantic vector representing the first known concept, the second semantic vector generated based on values mapped to a set of embeddings included in a definition of the first known concept, wherein the first cosine similarity value is based on the first angle; and determining a second angle measured between the first semantic vector and a third semantic vector representing the second known concept, the third semantic vector generated based on values mapped to a set of embeddings included in a definition of the second known concept, wherein the second cosine similarity value is based on the second angle.

19. The non-transitory computer-readable medium of claim 17, wherein determining the first pertinence value and the second pertinence value comprises:

assigning, based on tokens included in the data snippet, topics for the data snippet;

generating, based on the topics for the data snippet, a topic vector for the data snippet, the topic vector for the data snippet representing a distribution of the topics for the data snippet in the data snippet;

determining a similarity between the topic vector for the data snippet and a topic vector for the first known concept, the topic vector for the first known concept representing a distribution of topics of the first known concept, wherein the first pertinence value is based on the similarity between the topic vector for the data snippet and the topic vector for the first known concept; and determining a similarity between the topic vector for the data snippet and a topic vector for the second known concept, the topic vector for the second known concept representing a distribution of topics of the second known concept, wherein the second pertinence value is based on the similarity between the topic vector for the data snippet and the topic vector for the second known concept.

20. The non-transitory computer-readable medium of claim 17, wherein the content item is a document including text, and the data snippet is a subset of the text included in the document.

21. The non-transitory computer-readable medium of claim 17, the operations further comprising:

identifying, from the content item, a second data snippet that is different than the data snippet;

analyzing the definitions of the set of known concepts included in the data graph based on tokens included in the second data snippet to identify known concepts that are related to the second data snippet;

in response to being unable to identify at least one known concept from the set of know concepts included in that data graph that is related to the second data snippet, generating a new concept based on the second data snippet; and adding the new concept to the knowledge graph.

22. The non-transitory computer-readable medium of claim 21, wherein generating the new concept based on the second data snippet comprises:

generating a definition for the new concept based on the tokens included in the second data snippet;

generating a semantic vector representing the new concept, the semantic vector representing the new concept generated based on a set of semantic vectors generated based on other data snippets that are determined to be similar to a semantic vector generated based on the second data snippet; and generating a topic vector representing the new concept, the topic vector representing the new concept generated based on a set of topic vectors generated based on other data snippets that are determined to be similar to a topic vector generated based on the second data snippet.

23. The non-transitory computer-readable medium of claim 17, the operations further comprising:

determining a connection between at least two concepts identified in the content item;

generating a score indicating a strength of connection between the at least two concepts, the score determined based on combining log-likelihood ratio (LLR) scores, cosine similarity scores, and pertinence values determined for the at least two concepts; and adding the at least two concepts and the score indicating the strength of connection between the at least two concepts to the knowledge graph.

* * * * *